(12) United States Patent  
Smith et al.

(10) Patent No.: US 7,602,338 B2  
(45) Date of Patent: Oct. 13, 2009

(54) WIRELESS POSITION LOCATION AND TRACKING SYSTEM

(75) Inventors: Derek M. Smith, San Diego, CA (US); James D. Adams, San Diego, CA (US); Nicolas C Nierenberg, La Jolla, CA (US); Joseph C. Baker, Encinitas, CA (US)

(73) Assignee: Awarepoint Corporation, San Diego, CA (US)

( * ) Notice: Subject to any disclaimer, the term of this patent is extended or adjusted under 35 U.S.C. 154(b) by 0 days.

(21) Appl. No.: 11/925,822

(22) Filed: Oct. 27, 2007

(65) Prior Publication Data

US 2008/0042901 A1 Feb. 21, 2008

Related U.S. Application Data

(62) Division of application No. 10/968,814, filed on Oct. 18, 2004, now Pat. No. 7,312,752.

(60) Provisional application No. 60/513,784, filed on Oct. 22, 2003, provisional application No. 60/528,052, filed on Dec. 9, 2003, provisional application No. 60/572,690, filed on May 19, 2004.

(51) Int. Cl.  
*G01S 3/02* (2006.01)

(52) U.S. Cl. .................... 342/451; 342/463

(58) Field of Classification Search .......... 342/451  
See application file for complete search history.

(56) References Cited

U.S. PATENT DOCUMENTS

| 3,805,265 | A | 4/1974 | Lester |
| 3,869,673 | A | 3/1975 | Close |
| 5,119,104 | A | 6/1992 | Heller |
| 5,402,450 | A | 3/1995 | Lennen |
| 5,450,615 | A | 9/1995 | Fortune et al. |
| 5,977,913 | A | 11/1999 | Christ |
| 6,259,406 | B1 | 7/2001 | Sugiura et al. |
| 6,259,894 | B1 | 7/2001 | Tekinay |
| 6,342,854 | B1 | 1/2002 | Duffett-Smith et al. |
| 6,529,164 | B1 * | 3/2003 | Carter .................. 342/463 |

(Continued)

OTHER PUBLICATIONS

Bahl, Paramvir et al, "Enhanceents to the RADAR User Location and Tracking System," Microsoft Research, Feb. 2000, pp. 1-13.*

*Primary Examiner*—Gregory C Issing  
(74) *Attorney, Agent, or Firm*—Clause Eight IPS; Michael Catania

(57) ABSTRACT

Techniques for accurate position location and tracking suitable for a wide range of facilities in variable environments are disclosed. In one aspect, a system for position location comprises a plurality of sensors (e.g. a network monitor, an environment sensor) for generating measurements of a plurality of sources, a plurality of objects or tags, each object generating measurements of the plurality of sources, and a processor for receiving the measurements and generating a position location for one or more objects in accordance with the received measurements. In another aspect, a position engine comprises a mapped space of a physical environment, and a processor for updating the mapped space in response to received measurements. The position engine may receive second measurements from an object within the physical environment, and generate a position location estimate for the object from the received second measurements and the mapped space.

7 Claims, 22 Drawing Sheets

U.S. PATENT DOCUMENTS

| | | |
|---|---|---|
| 6,799,047 B1 | 9/2004 | Bahl et al. |
| 6,839,027 B2 | 1/2005 | Krumm et al. |
| 6,839,560 B1 | 1/2005 | Bahl et al. |
| 6,889,032 B2 | 5/2005 | Dao et al. |
| 6,915,135 B1 | 7/2005 | McKee et al. |
| 6,985,745 B2 * | 1/2006 | Quaid .................... 455/456.2 |
| 6,990,428 B1 * | 1/2006 | Kaiser et al. ................ 702/150 |
| 7,050,819 B2 | 5/2006 | Schwengler et al. |
| 7,084,740 B2 | 8/2006 | Bridgelall |
| 2003/0043073 A1 * | 3/2003 | Gray et al. .................. 342/465 |
| 2004/0136384 A1 | 7/2004 | Cho |
| 2004/0147232 A1 | 7/2004 | Zodnik |
| 2004/0157551 A1 | 8/2004 | Gainey et al. |
| 2004/0212500 A1 | 10/2004 | Stilp |
| 2004/0235468 A1 | 11/2004 | Luebke et al. |
| 2005/0068925 A1 * | 3/2005 | Palm et al. .................. 370/338 |
| 2005/0075118 A1 * | 4/2005 | Lewis et al. .............. 455/456.5 |

\* cited by examiner

WIRELESS POSITION LOCATION AND TRACKING SYSTEM

CROSS-REFERENCES TO RELATED APPLICATIONS

The Present Application is a Divisional Application of U.S. patent application Ser. No. 10/968,814, filed on Oct. 18, 2004, which claims priority to Provisional Application No. 60/513,784, filed Oct. 22, 2003, now abandoned, Provisional Application No. 60/528,052, filed Dec. 9, 2003, now abandoned, and Provisional Application No. 60/572,690, now abandoned, and all hereby expressly incorporated by reference herein.

STATEMENT REGARDING FEDERALLY SPONSORED RESEARCH OR DEVELOPMENT

Not Applicable

BACKGROUND OF THE INVENTION

1. Field of the Invention

The present invention relates generally communications, and more specifically to a wireless position location and tracking system.

2. Description of the Related Art

There is a well-established demand for the ability to track the location of various objects and/or persons within various environments. Owners of various assets may want to be able to locate those assets with precision at any time, in order to make efficient use of them (i.e. for deployment or re-deployment in response to varying demand). Security applications may include locating missing equipment, or preventing the loss of equipment.

Satellite tracking systems, such as the Global Positioning System (GPS), and others, may be used to provide location determination around the globe. Satellite tracking systems generally do not perform well inside buildings, or in other locations where the satellite signals are not readily receivable.

Radio Frequency Identification (RFID) systems are being developed to track and locate items within defined areas. Passive RFID systems are limited to detecting the presence of an item within range of a portal. Typically, a portal or interrogator sends out a query signal and any tag (i.e., a device included in or attached to an object to be tracked) within range responds. Passive RFID tags generally do not have a power source.

Active RFID systems function in a similar manner, but the active tags have a power source, typically a battery, for longer range operation. RFID systems (active and passive) require installing a dedicated infrastructure of portals or interrogators for tracking which may be difficult or expensive to deploy, and may lack flexibility.

Other systems employ RF fingerprinting, whereby mobile devices measure signal strength from one or more beacons and attempt to correlate those measurements with signature measurements taken throughout the defined area. One example is the RADAR system. (See P. Bahl and V. N. Padmanabhan, "Radar: An In-Building RF-based User Location and Tracking System", in Proceedings of the IEEE Infocom 2000, Tel-Aviv, Israel, vol. 2, March 2000, pp. 775-784). One drawback of systems such as these is that the signature measurements are taken infrequently, and the measurement task may be cumbersome and expensive. The RF environment may change significantly throughout any given time period, and the accuracy of the location calculation will be degraded accordingly.

Other systems employ triangulation, whereby fixed devices measure the signal strength or propagation delay of a mobile device and use this information in conjunction with the known location of the fixed device to compute the location of the mobile device. These systems require installing a dedicated infrastructure of fixed devices for tracking, which may be difficult or expensive to deploy, and may lack flexibility.

There is therefore a need in the art for an accurate position location and tracking system suitable for a wide range of facilities in variable environments.

BRIEF SUMMARY OF THE INVENTION

An accurate position location and tracking system suitable for a wide range of facilities in variable environments is disclosed. In one aspect, a system for position location comprises a plurality of sensors, each sensor for generating a first plurality of measurements of a plurality of sources, a plurality of objects, each object generating a second plurality of measurements of the plurality of sources, and a processor for receiving one or more of the first pluralities of measurements and one or more of the second pluralities of measurements from the plurality of objects, and generating a position location for each one or more of the plurality of objects in accordance with the received first pluralities of measurements and the respective received second plurality of measurements.

In another aspect, one or more tags may be deployed, each comprising a receiver for receiving a plurality of beacon signals, a processor for generating positioning information in response to the received plurality of beacon signals, and a transmitter for transmitting the positioning information.

In another aspect, a sensor may comprise a network monitor comprising a receiver for receiving a plurality of signals from a plurality of sources, measurement circuitry for measuring one or more attributes of the plurality of received signals to produce a plurality of measurements, and a transmitter for transmitting the plurality of measurements to a remote position location estimation device, such as a position engine.

In another aspect, position engine comprises a mapped space of a physical environment, a receiver for receiving first measurements of the physical environment from one or more sensors, and a processor for updating the mapped space in response to the received measurements. In another aspect, the receiver further receives second measurements from an object within the physical environment, and the processor generates an object position location estimate for the object from the received second measurements and the mapped space.

Various other aspects are also presented.

DETAILED DESCRIPTION OF THE INVENTION

One or more exemplary embodiments described herein are set forth in the context of a wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. The word "exemplary" is used herein to mean "serving as an example, instance, or illustration. Any embodiment described herein as "exemplary" is not necessarily to be construed as preferred or advantageous over other embodiments.

Position Location System

According to one aspect of the invention, a model of an environment in which an object is to be located is maintained. The environment comprises a physically mappable space. One or more sensors may be deployed throughout the space to monitor the environment and provide feedback to what may be referred to as a "positioning engine", which may be a central or distributed computing resource for receiving feedback from one or more sensors and maintaining a mapping of the environment, referred to as a "mapped space." An object to be located transmits information comprising one or more measurements to the positioning engine, which projects the object information onto the mapped space and determines the object's location therefrom.

Figure 1:
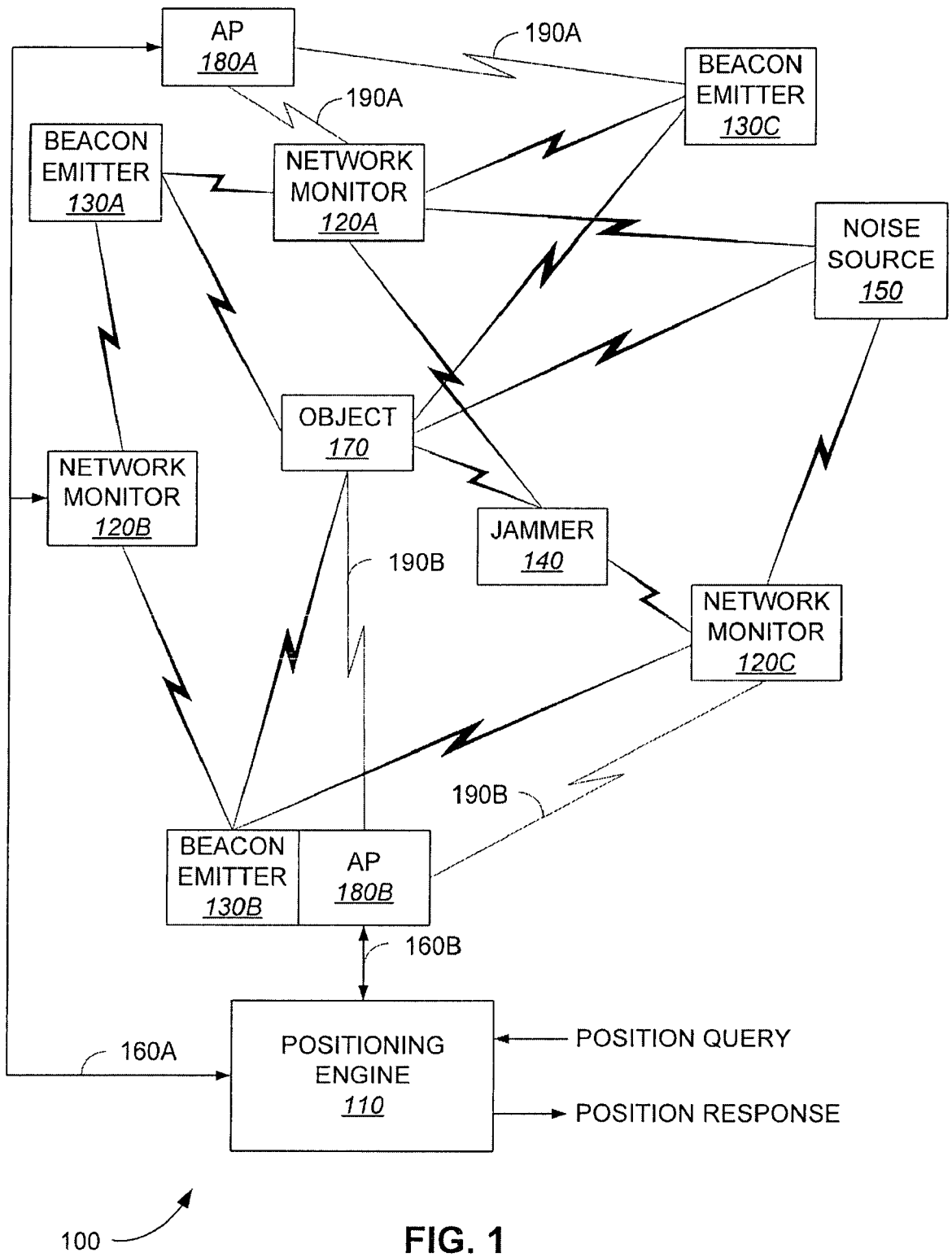
FIG. 1 is an example embodiment of a system for position location and tracking.

FIG. 1 depicts system 100 for position location of various devices within the system. In this example embodiment, object 170 provides information allowing its location to be determined within an area of a facility covered by system 100. Positioning engine 110, detailed further below, may be used for determining the position of and tracking of one or more objects 170 within the system.

Positioning engine 110 may receive a position query from an external application, or an end user. In response to a position query, positioning engine 110 provides a position response. The position response may include various information, such as the coordinates of the object, which may be two-dimensional, in which case an (X, Y) position may be returned, or a three-dimensional position (X, Y, Z) may be returned. In addition, other parameters such as a confidence level for a position (or area within which a position is expected) may be returned. Various other types of position responses may be returned, examples of which are detailed further below.

In the example embodiment, object 170 may be any object or asset for which tracking is desired. An object 170 may also be referred to herein as a mobile device or a tag. A tag may be a device that is attached to the object for which tracking is desired, example embodiments of which are detailed below. In an alternative embodiment, object 170 may incorporate the circuitry required to perform wireless tracking, as described herein. Object 170 receives wireless signals transmitted from various beacon emitters 130. A plurality of beacon emitters 130 may be deployed for generating beacons, or more generically as source signals, throughout some or all of the environment. Object 170, after receiving and measuring characteristics of the received beacon signals, and optionally measuring other environment parameters, transmits the measurements to positioning engine 110 via one of a variety of connections. In this example object 170 communicates with Access Point (AP) 180B over wireless link 190B. Access points are well known in the art. In the example embodiment, an IEEE 802.11 Wireless Local Access Network (WLAN) may be deployed. Example WLANs include IEEE standards 802.11 (802.11a-g, for example), IEEE 802.15.4, and derivatives thereof.

Any other wireless communications standard or specification may also be deployed. Example cellular-based data systems include: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Access point 180B communicates with positioning engine 110 over network connection 160B. It will be clear to those of skill in the art that any number of wireless and wired networks may be deployed, consistent with the principles disclosed herein. In this example, positioning engine 110 communicates over two wired networks, 160A and 160B. Wireless network 160A connects the positioning engine 110 with access point 180A, as well as a network monitor 120B.

Network monitors 120, also referred to as conditioners, calibrators, or sensors, may be deployed throughout the facility covered by system 100 to monitor and measure various environmental parameters associated with the network. The sensors 120 may measure one or more attributes of the signal (which may be any type of signal, including but not limited to an RF signal).

The plurality of sensors 120 may measure the surrounding physical environment and report to the positioning engine 110 any number of measurements, including temperature, humidity, signal characteristics of beacon emitters 130 and/or other noise or signal sources, etc. The feedback may be provided over time, such that characterization of the environment, correlated with one or more measurements, may be determined. For example, the effects of the reception of one or more beacons may be characterized as a function of temperature, humidity, or both. The feedback may be provided over any network or combination of networks, such as network 160 or 190.

In an alternative embodiment, the environment may inherently contain one or more signal sources that the sensors may measure and send to the positioning engine 110. These inherent signal sources may change over time, and may or may not be designed for providing the signal for measurement. A source may be another communication system or device not associated with the location system, or it may be have no deliberate communication function, i.e. it may be a noise source 150 or what would otherwise be characterized as a jammer signal 140.

A network monitor 120 delivers the measurements to positioning engine 110 over any type of network (i.e. wireless or wired networks). A network monitor is one type of sensor. In this example network monitor 120B communicates with positioning engine 110 on wired network 160A. Note that network monitor 120C communicates with access point 180B over wireless link 190B. Network monitor 120A communicates with access point 180A over wireless link 190A. The wireless links depicted need not conform to identical communication standards (i.e. one may be an 802.11 standard, while another may conform to another standard or specification, such as a cellular data or other wireless data connection).

Another example wireless LAN is the IEEE 802.15.4 standard, which may be deployed in a mobile device for communication using lower power. In one embodiment, a low power 802.15.4 radio link may be used to communicate between objects 170, while simultaneous communication links with 802.11 access points may also be supported.

In an alternate embodiment, not depicted in FIG. 1, detailed further below, an object 170 may communicate directly with a network monitor 120 over a wireless link. In such an example the wireless link between the object 170 and the network monitor 120 may be a low power link, such as an 802.15.4 link, while the network monitor 120 communicates with an access point 180, for ultimate communication with position engine 110, over another WLAN (802.1.1, for example).

Also shown in FIG. 1 is a wireless link 190A between access point 180A and beacon emitter 130C. In one embodiment, a beacon emitter may be programmable, so as to configure the type of beacon signal transmitted. A beacon emitter may also be configured to send any other information that may be desirable to transmit or broadcast along with the beacon signal. This may be accomplished through a wired or wireless connection to a beacon emitter. For example, beacon emitter 130B is shown connected with access point 180B and is connected to positioning engine 110 with wired network link 160B. Note that beacon emitter 130A is not connected to positioning engine 110 through any network connection. This illustrates an example of a beacon emitter that is preconfigured to transmit a beacon signal and does not need to be configurable while operating within the system.

The combination of beacon emitter 130B and access point 180B identifies another aspect of the present invention. An access point 180 may be used as a beacon emitter. For example, an 802.11 access point transmits a known periodic signal, which may be used for measurement by an object 170 as well as sensors 120 within the network. It is also possible to combine beacon emitters with network monitors, and a network monitor may also be combined with an access point. Various alternative embodiments are detailed further below.

Note also jammer 140 is shown in system 100. In some context, a jammer or noise source, such as noise source 150, may also produce an identifiable signature that may be measured by sensors and objects within the network. In this example, object 170 receives and measures signals from noise source 150 and jammer 140. Network monitors 120A and 120C also receive noise source 150 as well as the signal from jammer 140. This information may be transmitted to positioning engine 110 for use in position location.

Positioning engine 110 may also associate various measurements with other parameters, such as time of day, day or week, etc. Measurements may also be averaged over time. Sequences of measurements may be stored over a certain period and transmitted in bulk as desired.

In the example embodiment depicted in FIG. 1, the various sensors and/or network monitors may periodically measure environment conditions within the system at any rate desired. Thus, positioning engine 110 is periodically updated with refreshed data that may vary according to change in environment conditions. Other measurements of environment variables, such as temperature, humidity, time, etc., may be transmitted along with the measurements to allow for correlation of measurements associated with those indexing parameters. Thus, when an object 170 is tracked or located within the system, the measurements received from the object may be used to determine a location in accordance with an updated or current measurement of the environment. In a broad conception, positioning engine 110 maintains a model of the environment (or mapped space) in which an object is to be located.

An object 170, within the mappable three-dimensional space, makes measurements from one or more beacon emitters 130, or other sources, such as noise source 150 or jammer 140. Upon some triggering event, i.e. motion, sensor input, timer expiration, direction from a controlling device (such as a positioning engine 110), or a condition being met in accordance with one or more parameters (which may be pre-defined, or updated and transmitted to the object 170), the object 170 may transmit the measurement information across a network. The object 170 may also transmit information about the triggering event across a network. Note that, in an alternate embodiment, an alternate communication link may be deployed to communicate with one or more objects 170 (as described above). Thus, the object feedback network may be separate from the network 160 on which the sensors 120 provide feedback. Note further that the beacon emitters may be connected on a network, which may be connected to a controlling device (i.e. positioning engine 110, or some other device, details not shown). The beacon emitter's network may be a wireless network that may be used in whole or in part to provide the signal for monitoring and measurement by sensors 120 and objects 170. Alternatively, the beacon emitter's network may be separate. In an example embodiment, a Wireless Local Area Network (WLAN), such as an IEEE 802.11 network, is deployed and shared for communication with beacon emitters 130, sensors 120, objects 170, and positioning engine 110. Various other communication data, not used for location services, may also be transported on one or more of the above referenced networks (details not shown).

To determine the location of devices 170 in any given facility, the radio frequency (RF) environment in the facility may be measured. During this calibration procedure, one or more network monitors are placed at known locations in the facility. RF data from each device is measured and transmitted to positioning engine 110 (also referred to as a Location Positioning Engine (LPE)). A network monitor is also referred to as a conditioner, sensor, calibrator, or calibration device. The RF data is recorded along with the actual location of the network monitor to produce an RF data map of the environment. Such a data map is one example of a mapped space.

RF data measured by the network monitor 120 may include signal strength from beacon emitters 130, (which may be emitted by access points 180), signal strength of data from other mobile devices 170, ambient radio frequency noise in the environment (including a plurality of different frequencies), environmental information, (which may include ambient air temperature, ambient air humidity, and other measurable parameters of the environment), and any of the above information being transmitted to the network monitor 120 from one or more mobile devices.

In one embodiment, access point beacons are used as the RF data. For example, a WLAN access point may transmit beacons at regular intervals (e.g. 100 ms). A beacon may be a packet of data regularly transmitted by an access point in a WLAN containing WLAN configuration parameters to allow a WLAN device to communicate with the access point emitting the beacon. In an example embodiment, the network monitor 120 receives beacons from each WLAN access point 180 that is within range (i.e. any access point that the network monitor 120 can detect) for a predetermined time interval (e.g. five seconds).

In an example embodiment, a network monitor performs a statistical analysis (for example, determining the average, or variance, or other methods known in the art) on the access point beacon signal strength measurements prior to transmitting this data to the positioning engine via the WLAN. The known location of the network monitor is associated with the received data and stored in the positioning engine, thus creating an RF data map of the environment. Any technique may be used for entering the known location data into the positioning engine and associating the resulting measurements with those data. Examples are detailed further below.

The calibration routine may be performed continually (either periodically, intermittently, upon certain triggering events, etc.), with the positioning engine receiving RF data from the network monitors and updating the RF data map whenever new data is received. In an alternate embodiment, detailed further below, the RF data map consists of data points measured once (or infrequently) as well as data points that are continually adjusted.

When the RF data is received from a network monitor, the positioning engine may perform a statistical analysis (for example, determining the average, or variance, or other methods known in the art) on the received data to determine the quality of each datum. This information may be stored along with the RF data and may be used when computing location. Example techniques for computing location are detailed below.

In an example embodiment, the system 100 is installed in a facility with a wireless local area network (WLAN) 190 using the IEEE 802.11g standard. This WLAN consists of one or more Access Points (APs) 180 connected to a Location Positioning Engine (LPE) 110. This facility (for example a hospital with several floors) also has several network monitors 120 plugged into wall outlets. Most network monitors are located on the perimeter of the facility. There is approximately one network monitor for every one thousand square feet of the facility. The location of the network monitor is stationary and known to our system. For example, a network monitor may be located at a wall power outlet. This facility also has many tags 170 mounted on assets throughout the facility.

In this example, the APs transmit beacons periodically, for example, every 100 ms. The network monitors regularly (e.g. once a minute) listen for these beacons, measure the signal strength from them, and transmit this information (APID and signal strength) to the Location Positioning Engine. The LPE builds a model of the RF environment using a Radial Basis Function, although other neural network algorithms may be employed.

In this example, some tags are configured to transmit location data when they stop moving. Other tags are configured to transmit location data on regular intervals (e.g. once per day). This configuration can be changed by a user on a remote machine. A configuration may be applied to multiple tags. When the battery on a tag falls below a predefined threshold the tag wakes up and transmits an alert message to a user. The tags also transmit alert messages when detached from assets. These aspects, along with many others, are detailed further below.

Using Data Received from Fixed Devices to Modify Static Calibration Points

Figure 2:
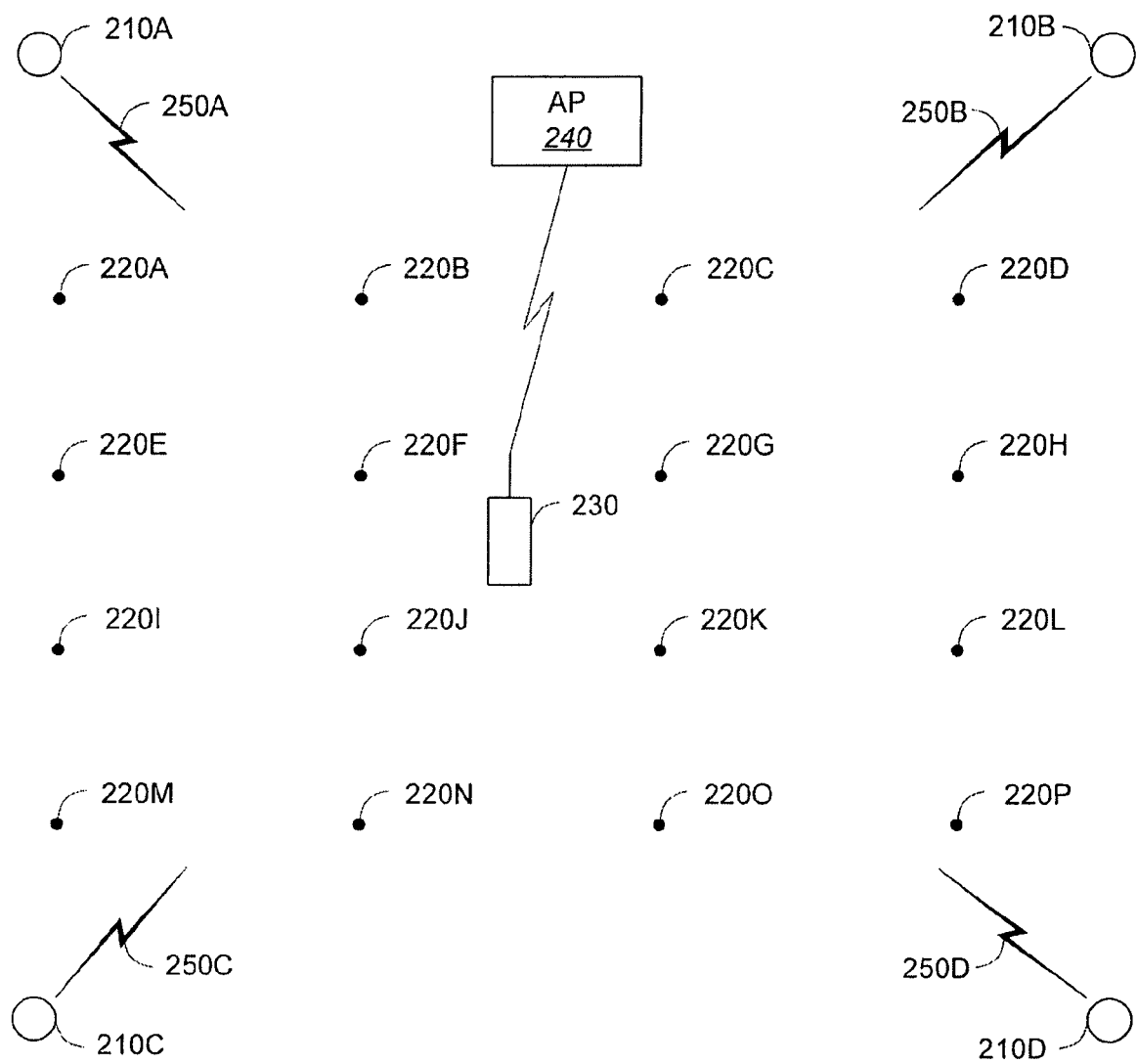
FIG. 2 depicts a prior art wireless tracking system.

FIG. 2 depicts a wireless tracking system as known in the prior art; such a system may be as disclosed, for example, in the RADAR system. In this type of system, the facility in which objects may be tracked is mapped into a variety of calibration points 220. In the prior art calibration points 220 are static calibration points, meaning that a measurement is made at one time (even if averaged over a fixed period of time) for each point. The measurements are stored, associated with the known locations of the static calibration points. The data for all of the static calibration points 220 are then used in position location. Beacon emitters 210A-D, in this example, provide the signals on which measurements are to be made. Thus, at static calibration point 220A, for example, the expectation would be that the measurement of beacon 250A is stronger than the beacons 250B-D. Static calibration point 220P may receive its strongest measurement of 250D, and so forth. Ideally, at each static calibration point a unique set of measurements identifies the location point. Thus, when an object to be located 230 moves throughout the facility, it may make measurements of the beacon signals received 210. Measurements of these signals may be transmitted over a wireless link to an access point 240. These measurements may be used for a position determination using any of the variety of techniques known in the art.

The drawback of such techniques is that, in practice, the radio frequency environment changes based on external environmental conditions. Thus, the accuracy of the location determination will vary depending on how closely the current environment matches the environment in which the static calibration was measured. Stationary objects appear to move because the environment constantly modulates. Manual calibration may be cumbersome and costly, and is unlikely to occur frequently enough to provide the desired level of accuracy.

In contrast, the example embodiment depicted in FIG. 1 may continuously (including periodically or intermittently) measure and provide feedback on the current environmental conditions. Position location determination may then be made more accurately based on the updated model (and in accordance with other environmental variables that may be measured). Example embodiments of these techniques are detailed further below.

In an alternate embodiment, not shown, a map of static calibration points such as that depicted in FIG. 2 may be combined with a system such as system 100 in FIG. 1. In this combination, network monitors 120 provide continual updates of the system environment, which may be used to adjust the position location determination, and the static calibration points may also be used to determine position. In other words, the mapped space may comprise a combination of continuously updating values as well as static calibration data.

In this example, there may be calibration points that are determined by observing the RF data at that location for an amount of time and then averaging this RF data to compute the average RF data for each data point in this data. Recall that static calibration points do not change over time (contrast this with a dynamic calibration point which continuously receives updates from a network monitor). However, if a network monitor is near a static calibration point then the system may modify the static calibration point based on: (a) the difference between an RF data measurement at a first point in time and an RF data measurement at a second point in time, the difference measured at the nearby network monitor; and (b) the distance between the static calibration point and a network monitor.

If a network monitor is very close to a static calibration point (i.e., the Euclidian distance between the two is small) then, as the RF data received by that network monitor changes from its initial values, the system may change the RF data stored with the static calibration point. The system may change each RF data value in the static calibration point in proportion to the difference between the network monitor's initial RF data and its current measured RF data. For example, consider a network monitor having initial RF data measurements of $S_1=4$ and $S_2=6$, (whereby $S_1$ is one RF characteristic that may be measured and $S_2$ is a second RF characteristic that may be measured) and a static calibration point having initial RF data measurements of $S_1=0$ and $S_2=1$. After a period of time, if the network monitor measures a new RF data value of $S_1=6$ and $S_2=9$, then the system may change the static calibration stored RF Data to be $SI=(0+2)=2$ and $S_2=(1+3)=4$. This information may now be used by the positioning engine to calculate locations.

If more than one network monitor is nearby a static calibration point, then the change in RF data at each network monitor may affect the static calibration point inversely proportional to the distance between the network monitor and the static calibration point. Equation 1 represents this effect:

$$S_{NEW} = S_{OLD} + \text{Average}\left(\frac{S_{1,C} - S_{1,I}}{D_1} + \frac{S_{2,C} - S_{2,I}}{D_2} + \frac{S_{3,C} - S_{3,I}}{D_3} + \frac{Sn, c - S_{n,I}}{D_n}\right)$$

Where:
$S_{NEW}$=the new RF data point for the calibration point;
$S_{OLD}$=the current stored RF data point for the calibration point;
$S_{n,c}$=the value of this RF data point calculated by network monitor n;
$S_{n,1}$=the initial value of this RF data point for network monitor n; and
Dn=the distance between the location of this calibration point and the location of network monitor n.

This average function may also use statistical methods including Kalman Filtering.

Figure 3:
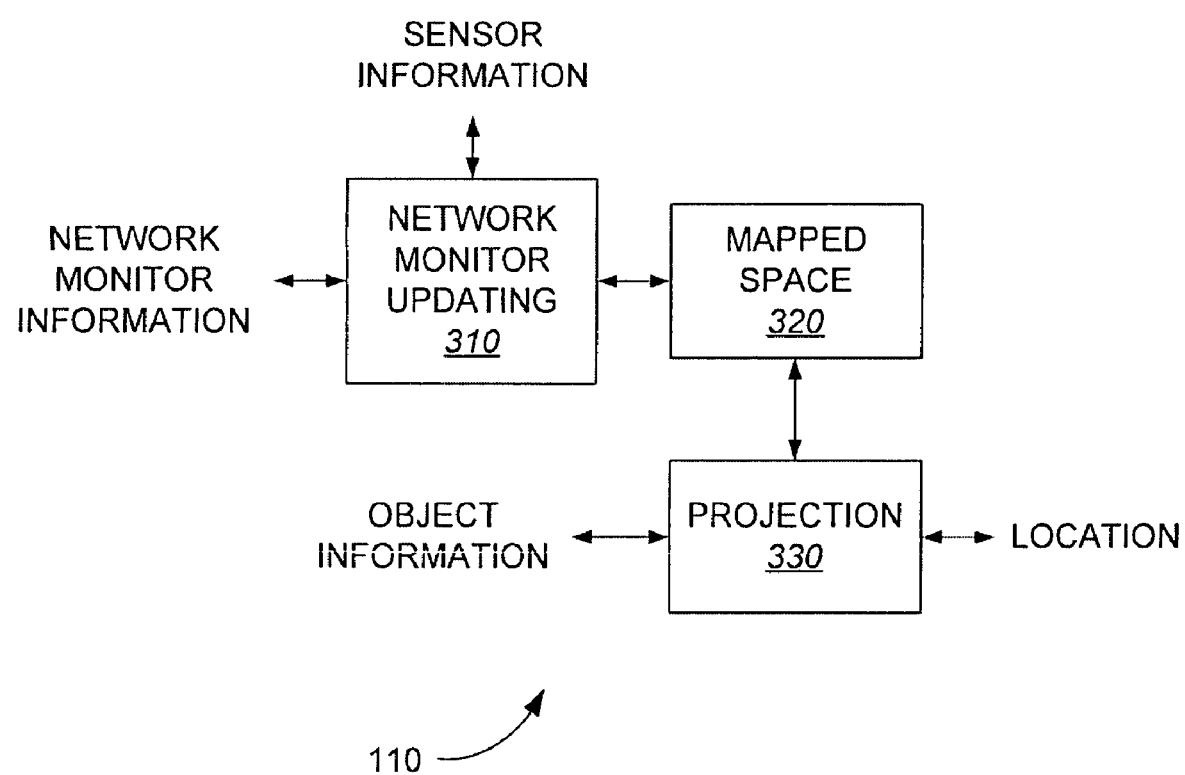
FIG. 3 depicts an example embodiment of a positioning engine.

FIG. 3 depicts an example embodiment of positioning engine 110. A subset of components and functions typically found in a positioning engine are shown, for clarity of discussion. Network monitor information is received in network monitor updating function 310. Network monitor information may be periodically transmitted, transmitted based on one or more triggering events (i.e. a change in one or more measured environment variable, etc.), or in response to a directive from the positioning engine, such as a command or message. Network monitor updating function 310 may use one or more of the measurements, in conjunction with measurements from other sensors and/or objects, including past measurements, to update the mapped space 320. Various representations of a mapped space will be apparent to those of skill in the art. Mapped space 320 is stored in a memory in the example embodiment.

The mapped space 320, which is a three-dimensional space in an example embodiment, may be estimated for locations interspersed between the network monitors using interpolation techniques, and may be updated over time. In alternate embodiments, the space may be two-dimensional, or comprised of one or more two-dimensional spaces associated with values of a third dimension to produce a three-dimensional mapped space. The mapped space 320 may be monitored and mapped, over time, according to changing variables such as temperature, humidity, etc., as described above. Any of the environmental variables may be recorded and monitored such that the expected behavior of the signals (i.e. from a beacon emitter 130 or noise source 150) may be interpolated to locations within the space outside of those associated with network monitors.

A mapped space of the mappable environment in which an object may be located is generated in the positioning engine 110. A three-dimensional space may be created by retrieving information from a plurality of network monitors 120 distributed throughout the space, whose x, y, and z coordinates are known. (A two-dimensional space may also be generated.) Each network monitor 120 may monitor and measure signals from one or more of a plurality of beacon emitters 130, or other sources, as described above. Note that a network monitor and a beacon emitter may be co-located, or combined in one device. As detailed further below, an object 170 may also serve as a network monitor or beacon emitter, in various alternate embodiments. Such an alternative may be particularly useful when an object has been located with a predetermined level of accuracy.

Object information, such as one or more measurements received from one or more objects 170, is received by projection function 330, and a location for the one or more objects is determined in accordance with mapped space 320. Note that, in an example embodiment, a measurement from an object may be used as a parameter or index into the mapped space, which is a representation of the potentially changing mappable physical space. The mapped space may be modified in response to various changes and uncertainties in the environment. Then the measurements from the object 170 may be used to project into the modified space. This may be performed in addition to attempting to modify or compensate for environmental changes in measurements from an object 170.

Figure 4:
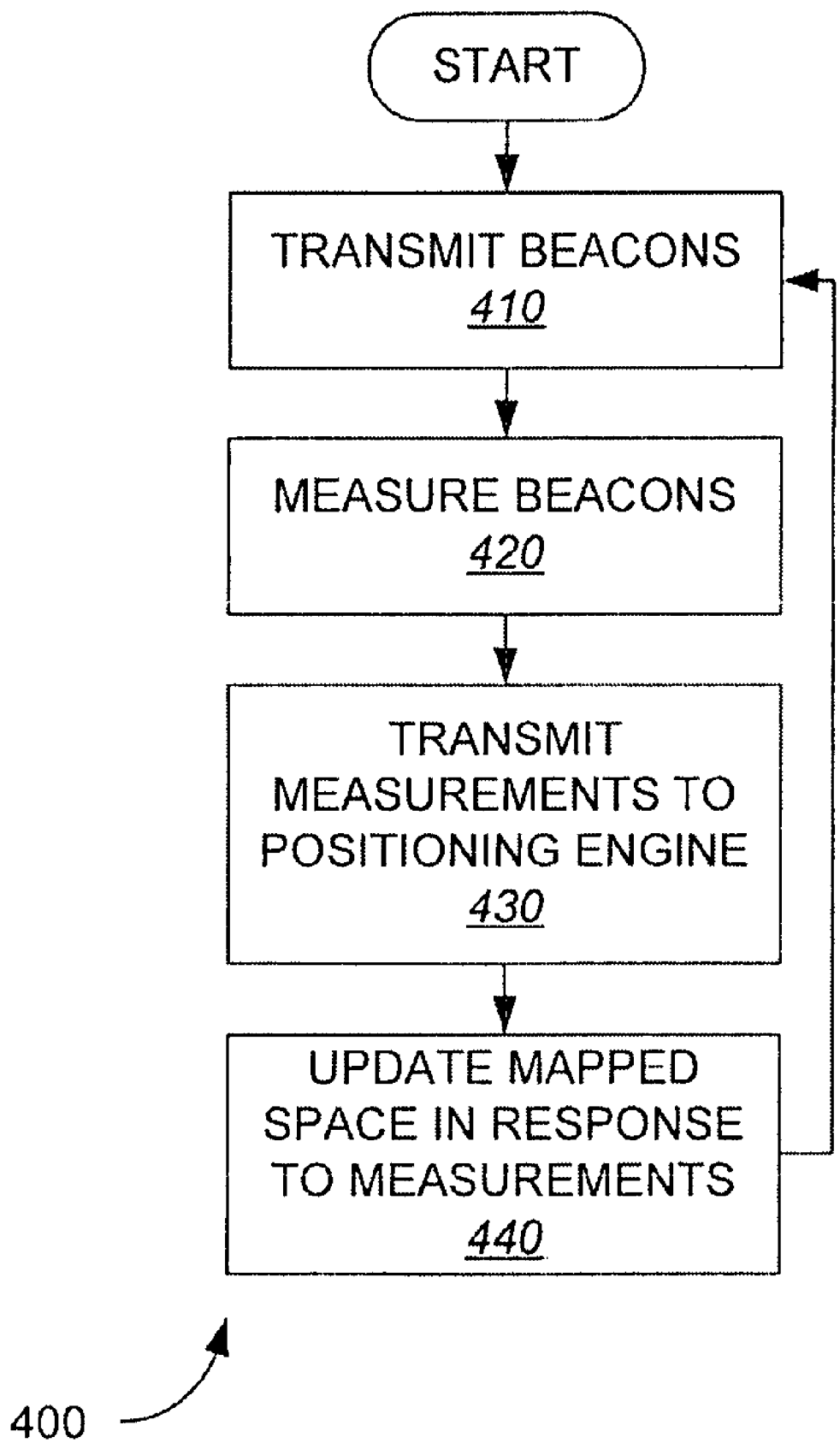
FIG. 4 is an example method for creating a mapped space.

FIG. 4 depicts example method 400 for creating a mapped space, such as for example system 100. This method may be applied to continuously (including periodically or intermittently) updating the mapped space. The process begins in block 410, where beacons are transmitted throughout the facility or area in which objects are to be tracked. Note that each beacon need not be receivable throughout the entire facility, but a facility may incorporate multiple beacons, one or more of which generally should be receivable at each location within the desired tracking area. Beacons may be transmitted as known signals, and may be any other noise source or jammer signal as well, as described above.

In block 420, various devices throughout the facility, such as network monitors 120, measure the beacons or mobile devices to be tracked 170. The beacons may be measured at network monitors, static mobile stations, access points, beacon emitters, any device containing a combination of one or more of the above, etc.

In block 430, measurements are transmitted to a positioning engine such as positioning engine 110. The transmission may be over a wireless link, through a wired connection, communicated through a power grid, any combination thereof, or any other type of communication link.

In block 440, the mapped space is updated in response to the received measurements. The process may then repeat and may be repeated for as long as tracking is desired. Note that in one embodiment, network monitor measurements are used to update the mapped space, while measurements from mobile stations 170 are used only for position location for that device. Alternate embodiments may allow for one or more of the mobile devices' measurements also to be used to update the mapped space. For example, as detailed below, the measurements from stationary mobile devices may be used to update the mapped space when the location of the stationary mobile device is known to within a predetermined degree of certainty. When that mobile station moves, in this example, the measurements will again be used for location only, not for updating the mapped space. Various other combinations will be readily ascertained by those of skill in the art in light of the teaching herein.

In block 440, the mapped space may be comprised of one or more models, one or more subspaces, etc. The mapped space may be updated using other factors such as temperature, time, and humidity, calculations from other positioning engines, or any other known location data (such as static calibration points, for example).

Figure 5:
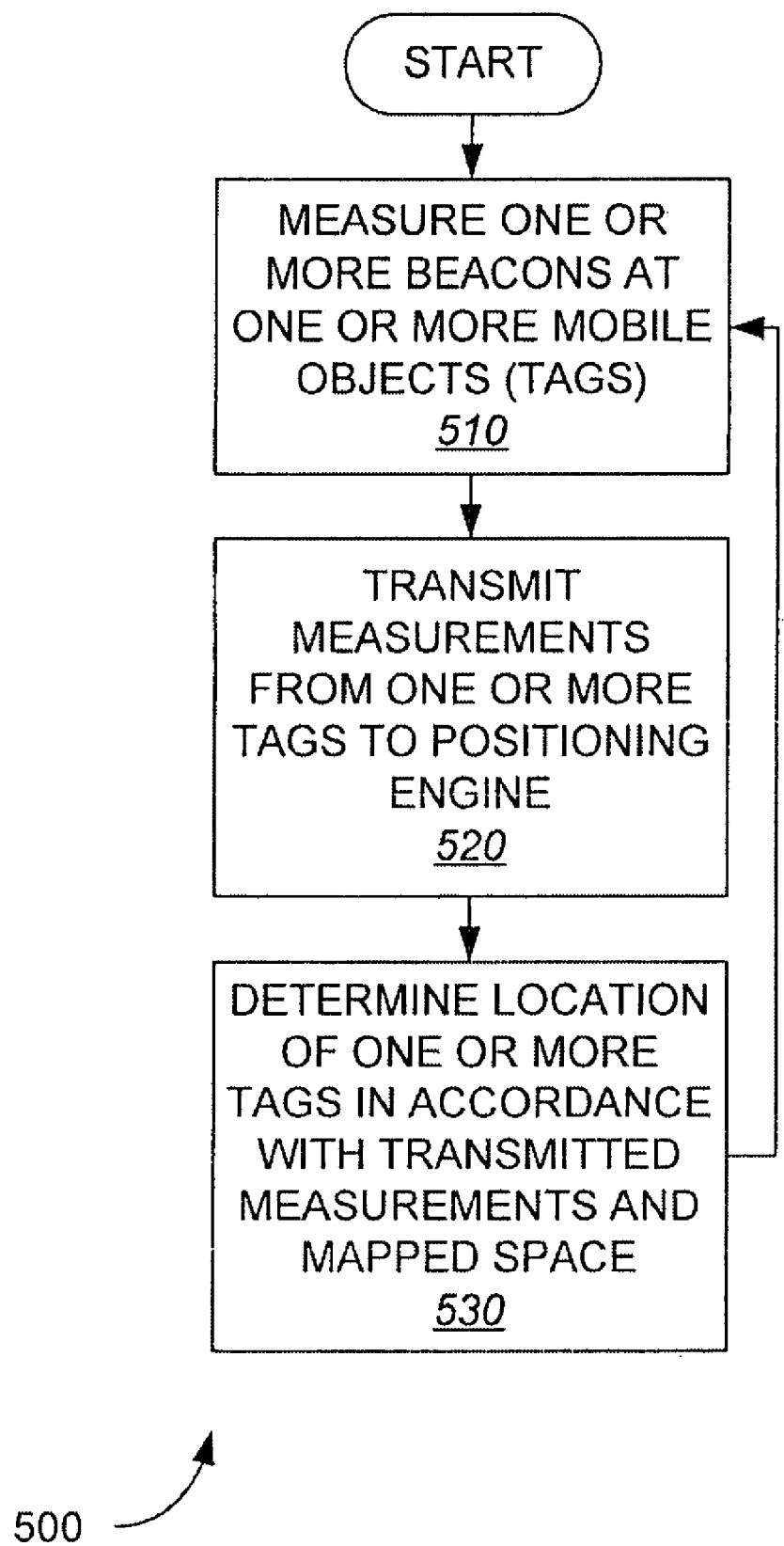
FIG. 5 is an example method for determining position location.

FIG. 5 depicts an example method 500 for determining position location within a system such as system 100. The process starts in block 510 where one or more beacons are measured at one or more mobile objects (tags), i.e. objects or tags 170.

In block 520, each mobile object or tag 170 transmits measurements to positioning engine 110. Various alternatives for the number of transmissions, the frequency of transmissions, etc., may be deployed. The frequency of transmission need not be identical for any two objects, and need not be periodic. For example, transmissions may be event driven. Some example embodiments are detailed further below.

In block 530, determine the location of one or more tags in accordance with the transmitted measurements and the mapped space (such as the continuously updated mapped space described with respect to FIG. 4 above).

Various applications may interface with a location positioning engine such as position engine 110. Applications may communicate via any one of the numerous networks described above or may have alternate connections with the positioning engine. Various applications may produce queries and receive responses regarding the location of one or more assets to be tracked within the system. In addition, a positioning engine may be programmed to generate certain alarms based on predefined rule sets. For example, when an asset of a certain class travels outside a predefined area, an alarm may be generated to notify one or more applications (including an application for notifying an end user) that the alarm condition has been triggered. Various applications may also have such rules built-in for performing tracking, information gathering, location determination, and other activities in a separate application. In an alternate embodiment the positioning engine may be programmable to perform these tasks as well.

Network Monitor

Figure 6:
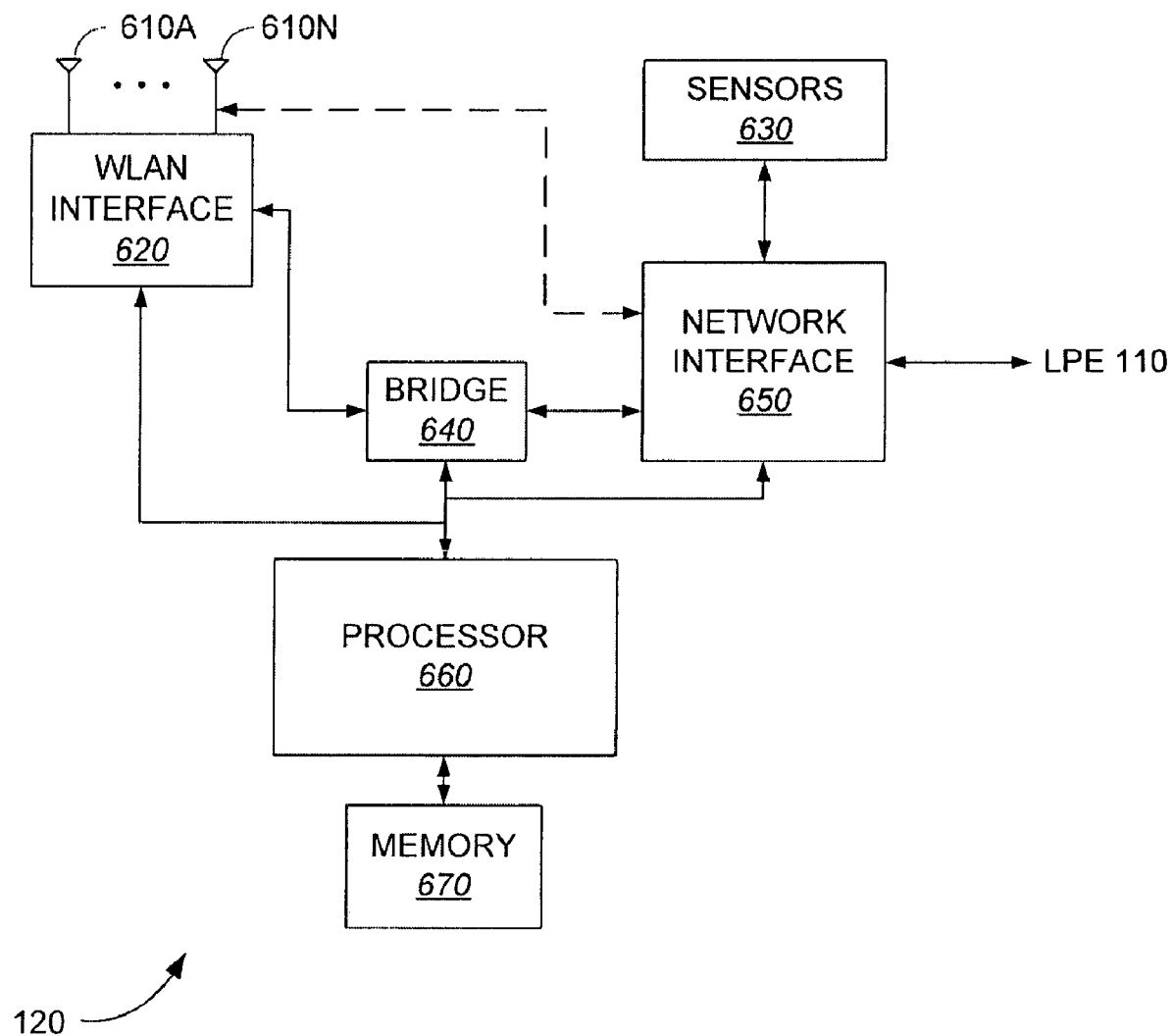
FIG. 6 depicts an example embodiment of a network monitor.

FIG. 6 depicts an example embodiment of a network monitor 120. Only a subset of components of a network monitor 120 is shown, for clarity. In this example, WLAN interface 620 is connected with one or more antennas 610A-N. WLAN interface 620 is used to receive and measure signals in the RF environment, primarily the signals from beacon emitters 130, but possibly also including other jammers and/or noise sources that are in the RF environment, if desired. Network interface 650 is shown connected to positioning engine 110. This network interface may be a wired or wireless connection. A dashed line connection to antennas 610 indicates that network interface 650 may use a wireless interface to communicate with positioning engine 110 as well. Antennas 610 may or may not be shared between WLAN 620 and network interface 650 in such an example (i.e., a separate antenna or set of antennas may be deployed).

Sensors 630 are shown connected to network interface 650. Sensor 630 may measure other environment variables local to the network monitor 120 such as temperature, humidity, RF noise, etc. In an alternate embodiment, sensors 630 need not be deployed.

Bridge 640 is deployed between WLAN interface 620 and network interface 650. This optional component may be deployed to produce a network bridge between one network and another. For example, WLAN 620 may be used to communicate with tags 170 using a wireless interface, such as 802.11, 802.15.4, or any other standard. Bridge 640 may be used to transfer traffic from mobile devices through WLAN 620 to any network connected to network interface 650, which may use an alternate network such as a wired network or an alternate wireless network. In the example embodiment, a network monitor is equipped with a connection to an external power supply. This power supply may comprise a network for communication with positioning engine 110. (In an alternate embodiment, a network monitor may comprise a battery or other local power generation source.)

Processor 660 is shown connected to various devices in FIG. 6 and may direct the communication between any of the above-described devices. One or more of the functions described as being contained in a discrete component of FIG. 6 may also be performed in processor 660, such as bridging network traffic from WLAN 620 to network interface 650, performing processing for either WLAN or network interface, sensor control, or measurement computation.

Processor 660 may be a general-purpose microprocessor, a digital signal processor (DSP), or a special-purpose processor. Processor 660 may be connected with special-purpose hardware to assist in various tasks (details not shown). Various applications (position based applications, for example, as well as any other type of applications) may be run on externally connected processors, such as an externally connected computer or over a network connection, may run on an additional processor within network monitor 120 (not shown), or may run on processor 660 itself. Processor 660 is shown connected with memory 670, which may be used for storing data as well as instructions for performing the various procedures and methods described herein. Those of skill in the art will recognize that memory 670 may be comprised of one or more memory components of various types, that may be embedded in whole or in part within processor 660.

Note that WLAN 620 may include multiple radios for communicating on multiple wireless interfaces. In an example embodiment, WLAN interface 620 may be used to communicate with tags 170 or other wireless devices within range, in addition to measuring the RF environment. In an alternate embodiment, a network monitor may simply contain a measurement device for connection to antenna 610 for receiving and measuring the beacons and a network interface to transmit those measurements using WLAN interface 620 to positioning engine 110.

In an alternate embodiment, a network monitor may also measure the wireless transmissions from a tag. Such measurements may be transmitted to the location positioning engine and used in locating that tag or mobile device. For example, if a network monitor measures a strong signal from a tag (i.e., a measurement exceeding a predetermined threshold), it may be determined that the tag is located nearby the network monitor. If one or more additional network monitors measure the transmissions from the tag, the position location determination may be assisted for that tag (i.e. triangulation). This position location method may be combined with various others, examples of which are detailed further below.

Figure 7:
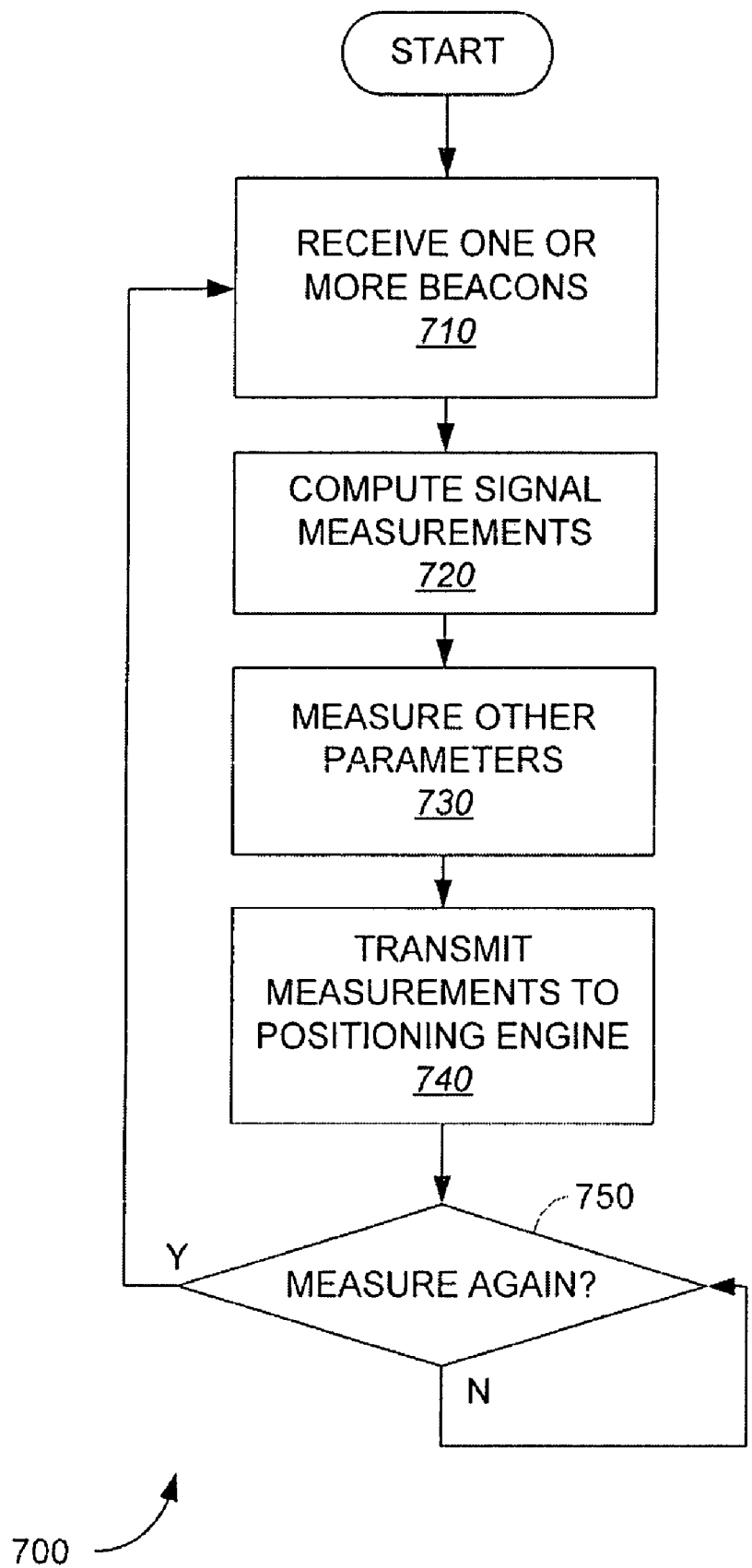
FIG. 7 is an example method for network monitoring.

FIG. 7 depicts example method 700 for network monitoring. The process begins in block 710 where the network monitor receives one or more beacons. In block 720, the network monitor computes signal measurements for one or more of the beacons received. In block 730, the network monitor may optionally measure other parameters such as temperature, humidity, signal strength of wireless devices, other RF noise, etc. In block 740 the network monitor transmits one or more of these measurements to a positioning engine, such as positioning engine 110.

In decision block 750 the process may pause until it is time to measure parameters again, in which case the process repeats beginning in block 710. The measurement process may be periodic. Alternatively, measurements may be based on whether or not changes have occurred in the environment. In an alternate embodiment, not shown, a network monitor may store various measurements along with a timestamp and the measurements may be transmitted in bulk to the positioning engine as desired. Bulk transmission may also be performed periodically or may be performed based on some predetermined condition occurring in the environment, or upon request by a positioning engine.

Mobile Device (Tag)

Figure 8:
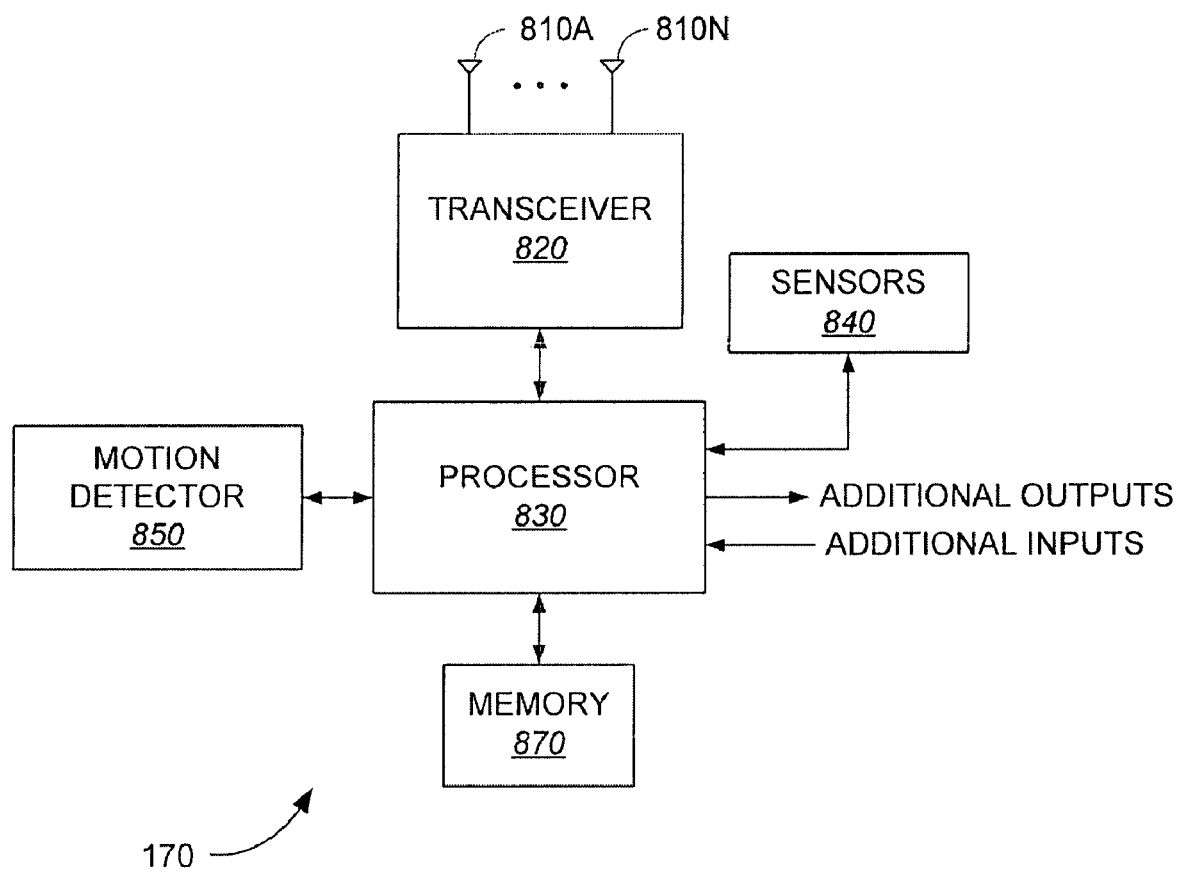
FIG. 8 depicts an example embodiment of a tag.

FIG. 8 depicts an example embodiment of an object or tag 170. As described above, a mobile device may incorporate one or more of the components depicted, or the components may be incorporated into a tag for connection to or attachment on the device to be tracked. A subset of the components of a mobile device or tag 170 is shown for clarity of discussion. [0099] In this example, transceiver 820 communicates through antennas 810A-N over a wireless link to one or more devices. As described above, a tag may receive signals from beacon emitters 130 as well as other RF signal sources. A tag 170 may also communicate with a network monitor 120 (optionally operating as a network bridge), an access point 180, or any other wireless communication device. Transceiver 820 is shown connected with processor 830.

Transceiver design technique design is well known in the art. Any given embodiment will be deployed in accordance with one or more communication standards or specifications it supports. In this example, transceiver 820 may be capable of making various RF measurements. For example, transceiver 820 may measure each beacon and store a Received Signal Strength Indicator (RSSI) for each beacon. An average RSSI may be computed for each beacon to produce an Average Access Point Beacon Signal Strength (AAPBSS). Any number of other RF measurements may also be made. One or more of these measurements may be transmitted to the positioning engine, optionally based on various conditions, examples of which are detailed throughout this specification. A typical transceiver may comprise one or more processors (i.e. a baseband processor), which may be separate from processor 830, and may comprise various other components, examples of which include encoders, interleavers, modulators, decoders, deinterleavers, demodulators, searchers, amplifiers, filters, mixers, oscillators, digital-to-analog (D/A) converters, analog-to-digital (A/D) converters, diplexers, duplexers, and the like. The components necessary for communication according to any standard may be incorporated in multiple integrated circuits or other components. Transceiver 820 may be deployed to communicate according to and/or measure signals of multiple communication formats. Transceivers (which may comprise a receiver and a transmitter), receivers, and transmitters detailed throughout this specification may include one or more of these various components, among others, i.e. transceivers in WLAN interface 620 or network interface 650, transmitter 1320, or transceiver 1420.

Processor 830 may be a general-purpose microprocessor (or microcontroller), a digital signal processor (DSP), or a special-purpose processor. Processor 830 may perform some or all of the functions of tag 170, described above with respect to other blocks. Processor 830 may be connected with special-purpose hardware to assist in these tasks (details not shown). Various applications (position based applications, for example, as well as any other type of applications) may be run on externally connected processors, such as an externally connected computer or over a network connection, may run on an additional processor within tag 170 (not shown), or may run on processor 830 itself. Processor 830 is shown connected with memory 870, which may be used for storing data as well as instructions for performing the various procedures and methods described herein. Those of skill in the art will recognize that memory 870 may be comprised of one or more memory components of various types, that may be embedded in whole or in part within processor 830.

Motion detector 850 is connected with processor 830 as well. A motion detector 850 is optional. Various techniques for using detected motion may be used in position location. Example techniques are detailed further below. Various types of motion detectors are well known in the art. For example, a motion detector may change the level of an electrical signal when acceleration exceeds a predetermined level (e.g. a spring or mercury based movement switch) or it may convert physical acceleration into electrical signals (e.g. an accelerometer). These signals may be transmitted to processor 830 as analog voltages or digital pulses. The motion detector 850 may be powered up or powered down by the processor. Detected motion may be used to enter or leave a low power state, to conserve battery. A motion detector 850 may also include a compass for determining a heading, which may be used in other computations and/or transmitted to one or more other network components.

In one example, a tag may transmit measurements of received signals only when the tag is in motion or begins moving. This allows the mobile device to enter a low-power state when the device is not in operation. In such a low power state, the device may simply omit measurement and transmission or may measure and/or transmit at a lower frequency than when the device is moving. This allows the mobile device to conserve its battery, if an alternate power supply is not being used.

As a result of other methods described herein, after a mobile device has been stationary for a certain amount of time, its location may be known with a high amount of accuracy. As a result, a stationary mobile device may be used as a network monitor while it remains stationary. In this example, after the device has been stationary for a long period of time and its location is accurately known, this device may be added as a dynamic calibration point in the system for use by the positioning engine. Once this device moves, the dynamic calibration point may be deleted.

Sensors 840 are connected to processor 830 for measuring various other environment conditions local to tag 170, for transmission to location-position engine 110 via transceiver 820. Sensors (including optionally attachable external equipment) may be used to detect various conditions. Sensors may detect the presence of radiation, biological agents, certain chemicals, or may record air temperature, pressure, humidity, movement, acceleration, etc. In one embodiment, the sensors may detect if the device is attached to a person. Example methods of detecting if the device is attached to a person include a contact switch, conductive wrist strap, skin temperature or resistivity measurement, and other methods. Sensors may be internal or external to the device. The device may be configured to either poll various sensors, or may accept a continual stream of data therefrom. In various embodiments, any condition may be used to trigger a tag or device 170 to take one or more actions. For example, a tag may exit a low-power state based on some detected anomaly. Or, a tag may transmit measurements based on certain pre-determined criteria.

Processor 830 is shown connected to additional outputs, which may include an LED output, an LCD display screen, an audible indicator, a tactile indicator (i.e. a vibrator), or any other type of input/output device. An object or tag 170, in conjunction with the other system elements described herein, may trigger an alert or alarm based on various criteria. By analyzing location data in real-time, a system 100 (including the positioning engine 110, any other components, or applications connected to or operating thereon) may determine if a device, or something or someone attached to the device, is located in a restricted area (for example) or is in violation of pre-programmed criteria. Examples of such criteria include (a) a device located in a prohibited area (or leaving a desired area); (b) a device deviates from a pre-programmed route; (c) the location of the device; (d) the location of other devices within the system; (e) the current time or date; (f) the current accuracy of the locations being determined in the system; (g) data received from internal sensors or external equipment attached to the device; (h) data received from internal sensors or external equipment attached to other devices in the system; (i) the access point beacon signal strength exceeds a preconfigured threshold for that access point or (j) any combination of the above.

One or more indicators may be activated (for example, emitting sound of any type from an audible indicator, modulating brightness, color or other aspects of a visual indicator, or vibrating a tactile indicator) when any of a variety of criteria is met. Examples include, but are not limited to (a) a device's location is outside a set of permitted locations; (b) the device is not in range of one or more access points or other network components; (c) the device is out of range of any pre-selected device; (d) the device's battery voltage falls below a pre-programmed level; (e) the device is moved without authorization; (f) any of the devices' sensors 840 (either external or internal) exceed or fall below a pre-determined threshold; (g) the device is transmitting data to an access point or other network device; (h) the device is receiving data from an access point or other network device; (i) the device is functioning properly; (j) the device is not functioning properly; (k) the device is in a low-power state; (l) a network directed command; (m) any other definable criteria; or (n) any combination of the above.

When one or more criteria are met, the system may transmit an alert or alarm. Alarms or alerts may be sent to devices within the network or external to the system. An alarm or alert may be directed to tag or object 170, and one of the additional outputs may be used to indicate the alarm or alert, using any of the various techniques well known in the art. In addition, any device or user may be alerted, within the system, or external to it, via one or more of various means. Examples include (a) sending an email message; (b) sending a Short Messaging Service (SMS) message; (c) initiating a phone call; (d) sending a page; (e) sending an XML Web Service message; (t) sending an Instant Messenger (IM) message; (g) employing a Simple Network Management Protocol (SNMP) Trap; (h) connecting to another system (i.e., an alarm system within the monitored facility); or (i) any combination of the above.

Processor 830 may also receive additional inputs. In one example, a tag may be equipped with one or more buttons (or other input signaling devices). In one embodiment, an identification (Ident) button is deployed. The Ident button may be used when configuring a device within the network. An ident button may be used as follows: an asset may be selected (i.e., from a database or any other technique for identifying one of the devices to be tracked); the Ident button may be depressed, indicating to processor 830 that an identifier should be transmitted to the positioning engine. The identifier may identify the tag via some predefined number, or any other identification message may be deployed. This allows the tag identifier to be associated with the asset selected. Various refinements may be made to this technique. For example, if multiple identification messages are received, the process may be repeated. In an alternate embodiment, a barcode may be scanned to identify an asset, and then an Ident button may be depressed to indicate to the system that the tag identifier should be associated with the identification from the barcode scan.

Note that transceiver 820 may also include optional secondary transceivers for communication with alternate networks using any communication standard, as described above. For example, one transceiver (or, alternately, a receiver only) may be used to receive and measure signals from one or more beacon emitters 130 using whatever communication protocol is deployed for those beacons. An alternate transceiver may be deployed for reporting the measurement results as well as receiving commands, programming, or other communication with the network and/or position-location engine (i.e. position engine 110). Yet another transceiver may be deployed to communicate with an interrogating device, for example an RFID reader. When a signal is detected from the transceiver (for example the presence of an RFID reader) the tag may perform one or more actions, such as computing location, transmitting data on another transceiver, changing power states, etc. If the signal detected by the transceiver has identification information in it (for example the ID of the RFID reader), then the tag may also transmit the identification information on another transceiver.

In an example embodiment, an RFID transceiver is used to read and write to the memory in the device. For example, a device may be loaded with information at the factory (i.e., an address), which may be read by an RFID scanner. As another example, any data payload, such as a text file, XML file, picture, etc., may be written to and stored on a tag. Such data may be read by other RFID scanners, or otherwise transmitted via network connections and the like. An example RFID equipped tag may transmit data according to the ISO 15693 signaling scheme.

Motion detector 850 may comprise one or more accelerometers for detecting motion along one or more axes. Motion detector 850 may include a compass for determining which direction the mobile device is traveling. Various other motion-detection techniques, well known in the art, may be deployed within the scope of the present invention. Motion detector 850 may be used to compute a displacement vector, the displacement vector indicating the direction and/or distance traveled. For example, distance traveled may be computed by detecting acceleration and time between acceleration and deceleration back to stationary. From this, a displacement distance may be computed. If multiple such devices are deployed, a displacement along an X axis may be computed as well as along a Y axis. From these two variables, a displacement vector may be computed. Alternatively, or additionally, a compass may be used to determine the direction of the displacement vector. Any detected motion or displacement information may be transmitted via transceiver 820 to positioning engine 110 for use in location detection.

In an alternate embodiment, a tag 170 may transmit measurements when motion is detected and when motion stops. In another alternative, the transmission may only occur when the tag is moving. In yet another alternative, detailed further below, measurements are periodically transmitted while the tag is stationary. This information may be used in similar fashion as network monitor data. In yet another alternate embodiment, location computation based on transmitted measurements from a tag may be averaged when the tag has indicated that it is standing still. This information may also be used to measure the error or confidence level of a particular location determination that has been made. These and other examples are detailed further below.

As described above, a static object or tag 170 may be used as a network monitor in an alternate embodiment. This technique may be deployed effectively when a fairly accurate location determination for the tag may be made. In one example, the location of a tag may be known precisely. For example, consider a docking station or cradle used for recharging a mobile device. If the location of the docking station or cradle is known precisely, and the tag can determine when it is cradled or docked, it may transmit measurements of the environment while it is in a stationary condition at the known location. Thus the mobile device can act as a network monitor and its data may be used by a positioning engine to update the mapped space, potentially increasing the accuracy of the location determination of other objects within the area.

Note that transceiver 820 may include secondary radio interfaces. In one example, one or more transceivers are deployed to transmit according to one or more transmission standards. In an alternate embodiment, a single transceiver is deployed that may be programmable to operate according to one or more communication standards. For example, a low-power radio transmission standard may be used for transmitting data to the location-position engine via network monitors 120 in one embodiment or access points 180 in another (or a network monitor may include or be co-located with an access point). An alternate radio interface may be used for measuring and/or transmission on a WLAN incorporated with beacon signals. For example, if an 802.11 access point is used for a beacon signal, it may also be used by the wireless device, such as a tag 170, to communicate data as well as for measuring the RF environment for use in position-location determination. Any other wireless radio standard may be deployed as well, such as Ultra Wideband (UWB), cellular data standards such as those described above, and the like.

A system 100 may incorporate multiple wireless interfaces for various tags and/or mobile devices. For example, if one wireless interface accommodates a smaller form factor which may be suitable for small tags and/or longer battery life, that may be deployed for a subset of the assets to be tracked within the system. At the same time, a different form factor for a larger asset to be tracked may be acceptable. Or, an asset to be tracked may already include a wireless interface that may be coupled with one or more components described herein to comprise tag 170.

A tag may also operate as a network bridge, in similar fashion as described above with respect to the network monitor 120. For example, a tag may communicate with one or more other mobile devices over a wireless interface such as 802.15.4 or another wireless standard. The tag may then transmit or receive data on an alternate network. Thus, for example, tags that communicate according to one radio standard may use another remote tag, including one that communicates according to two or more standards, as a bridge to maintain connectivity. Those of skill in the art will recognize these and myriad other combinations of radio communication links that may be deployed within the scope of the present invention.

Figure 9:
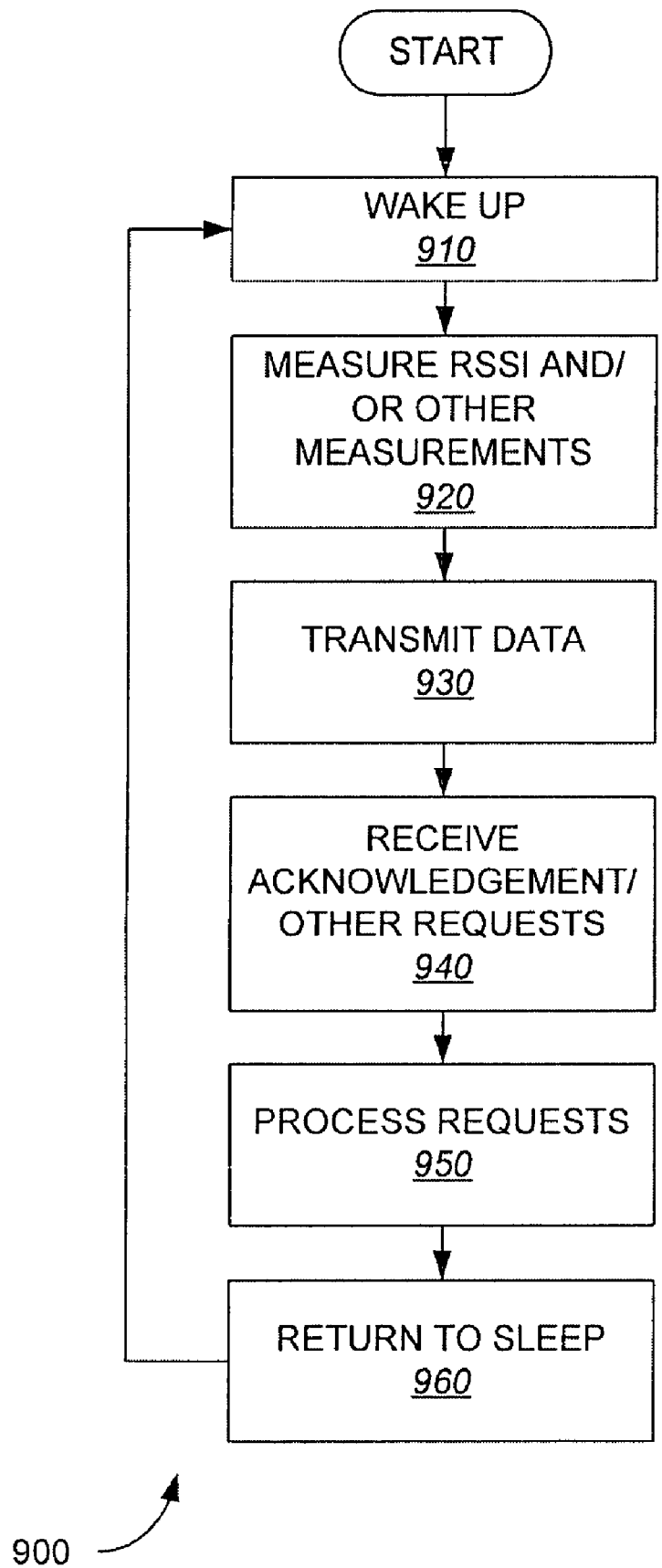
FIG. 9 is an example method for updating a tag location.

FIG. 9 depicts example method 900 for updating a tag location. Note that the blocks depicted are illustrative only. Any individual embodiment need not perform all of these steps. The process begins in block 910 when the tag wakes up. For example, as described above, a tag may periodically enter a low-power state to conserve battery life and wake up to perform measurements and transmit as necessary.

In block 920, the tag measures the Received Signal Strength Indicator (RSSI) of various beacons and/or makes other measurements such as temperature, humidity, RF noise, etc. Note that a tag 170 may also measure signal strength of network monitors, other mobile devices, beacons, etc. A tag may measure the signal strength of other co-located or nearby tags, for example, in an alternate embodiment. In one embodiment, an Average Access Point Beacon Signal Strength (AAPBSS) from each is measured and computed. In block 930, data is transmitted to the positioning engine.

In block 940, the tag may receive an acknowledgement that the transmission was received and may receive other requests. For example, various parameters may be changed from time to time within the tag, such as frequency of measurement, types of measurements to be made, communication parameters, and so forth.

In block 950, the tag processes any received requests and, subsequent to such processing, returns to sleep in block 960. Various embodiments will incorporate various means for waking up the tag 170 and returning to block 910 to repeat the process. For example, a periodic timeout may be used to wake up the tag, which may or may not be programmable over the air. Or, a motion-detection device may be used to indicate that the tag should wake up.

Figure 10:
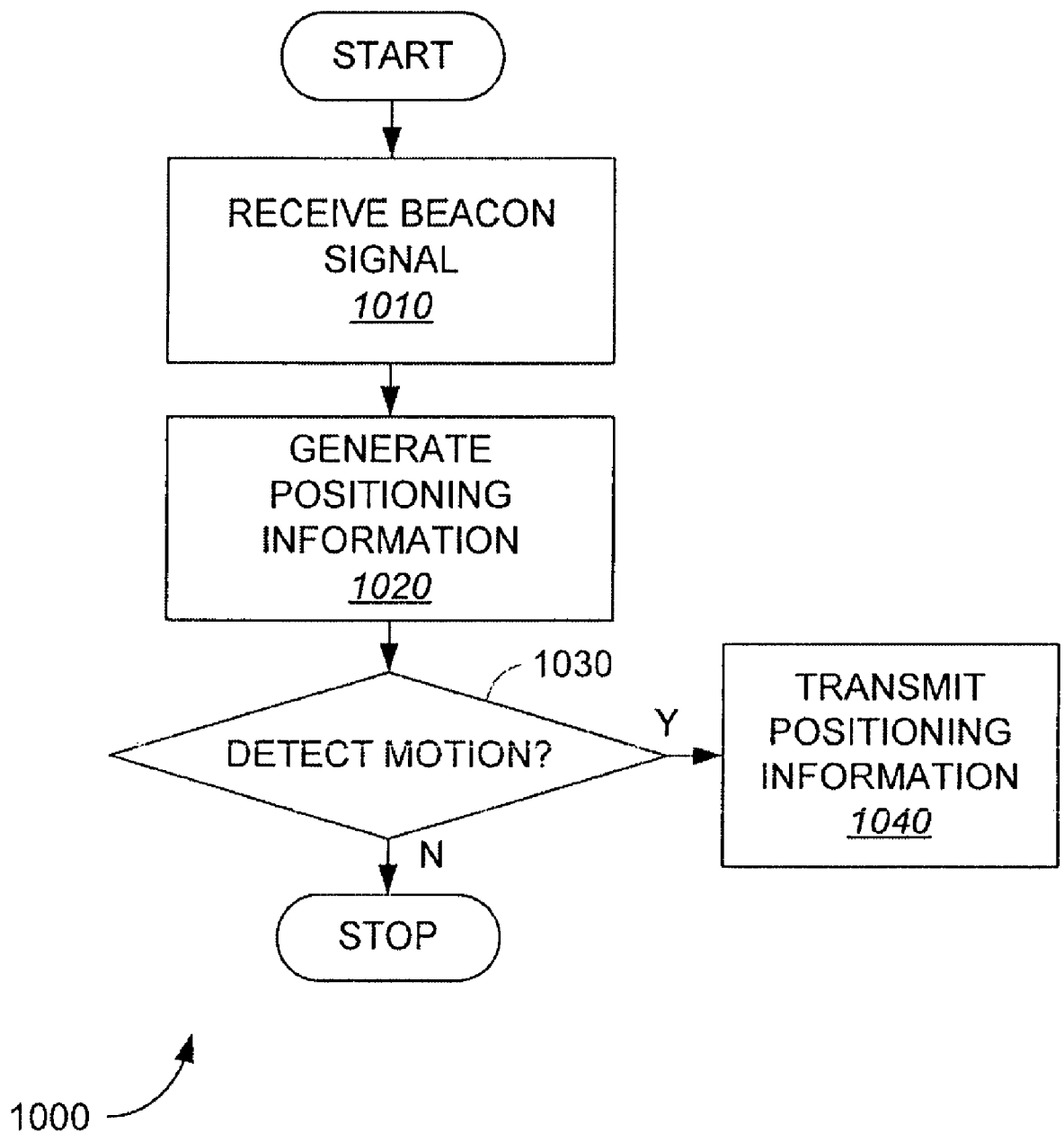
FIG. 10 depicts an example method for transmission of parameters in response to detected motion.

FIG. 10 depicts example method 1000 for transmission of parameters in response to detected motion. The process begins in block 1010, where the mobile device or tag receives a beacon signal. In block 1020, the mobile device generates positioning information in response to the received beacon signal or signals. The positioning information may comprise RSSI data or the AAPBSS data detailed above. In an alternate embodiment, the positioning information may also include a position estimate generated locally at the mobile device. The position estimate may be made using any of a variety of techniques. For example, the mobile device may compute its position based on signal strength measured from one or more transmitting stations such as beacon emitters, access points, network monitors, and the like. A mobile device may also incorporate various other location detection techniques.

A mobile station may also compute a displacement vector based on an estimate of its movement. The mobile device may use any of the above described motion detection techniques or components in determining the displacement vector, including motion detectors, accelerometers, compasses, and the like. The displacement vector, as well as any related information, may also be included in the positioning information generated in block 1020.

In decision block 1030, if motion is detected, proceed to block 1040. In block 1040, transmit the position information generated to the positioning engine via any of the available communication links. Examples include transmitting to an access point, through a network monitor acting as a network bridge, and various other examples detailed herein. In decision block 1030, if motion is not detected, the process stops.

In this manner, method 1000 may be repeated periodically in accordance with a desired potential update rate. Accordingly, if a tag does not detect motion, no transmission is required. This has the benefit of preserving battery life by not requiring the mobile device to use its transmitter. In an alternate embodiment, not shown, the receiving of signals and generating of position information is also deferred until the tag wakes up by detecting motion. Thus, power need not be supplied to the receiver and no measure and/or computation or generation of positioning information will be required until motion is detected.

In yet another alternative, a mobile device or tag may measure and generate positioning information periodically, storing those results for transmission at a later time. Those results may be stored in accordance, or along with, an associated time stamp. The results may also be stored with corresponding measurements of other environment parameters such as temperature, humidity, ambient RF noise, and the like. The sets of generated positioning information, along with any associated data, may be transmitted together after motion has been detected (or based upon an alternate triggering event).

Figure 11:
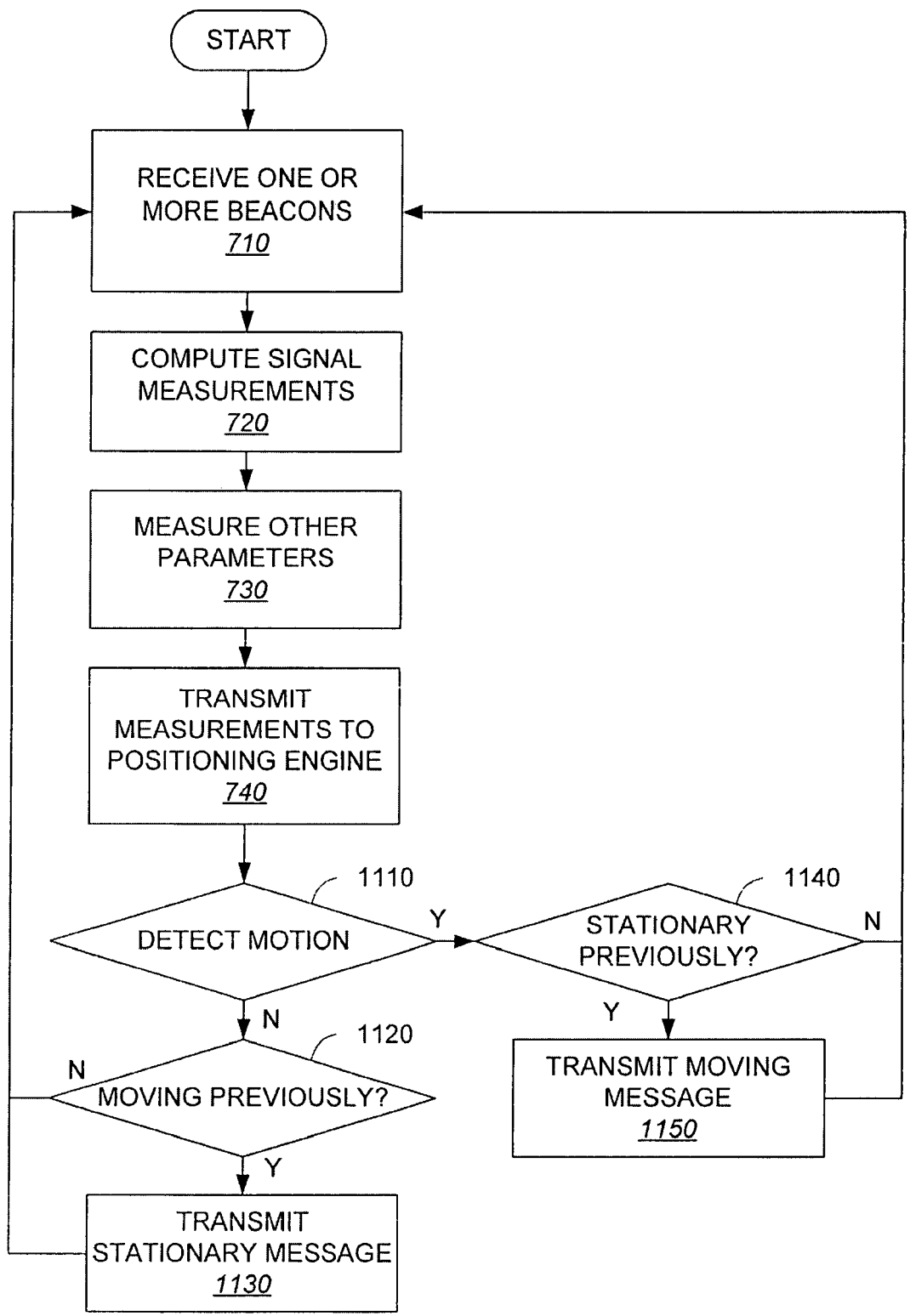
FIG. 11 is an example method for use in a mobile device or tag to indicate whether it is in motion or stationary.

A positioning engine may use knowledge of whether or not a mobile device is moving when determining the location of the corresponding device and/or updating the models for position location (i.e. updating the mapped space). FIG. 11 depicts an example method 1100, suitable for use in a mobile device or tag 170 to indicate whether it is in motion or stationary. Method 1100 may be used in conjunction with any other technique requiring the knowledge of whether or not a mobile device is in motion.

Method 1100 comprises block 710-740, which are identical to those of like number described with respect to FIG. 7. In these blocks, the mobile device receives one or more beacon signals, computes signal measurements, measures any other parameters, and transmits measurements to the positioning engine. Subsequent to transmitting the measurements to the position engine, proceed to decision block 1110.

In decision block 1110, if motion is detected, proceed to decision block 1140. In decision block 1140, if the mobile device or tag was previously stationary, proceed to block 1150 to transmit a moving message to the positioning engine. In decision block 1140, if the mobile device was not stationary previously, i.e. it was moving, there is no need to transmit a message, as the state has not changed. Instead, return to block 710 to process the next set of measurements.

In decision block 1110, if motion is not detected, proceed to decision block 1120. In decision block 1120, if the mobile device or tag was moving previously, it has now stopped. Thus, proceed to block 1130 to transmit a stationary message to the positioning engine. In decision block 1120, if the tag was not moving previously, then no change of state has taken place. Return back to block 710 and continue as described above.

In this fashion, the mobile station monitors whether or not it is in a moving state or a stationary state. It may send messages to the positioning engine so that the positioning engine also knows whether or not the mobile station is in motion. Various techniques are known in the art for transmitting messages of various types and any such technique may be deployed within the scope of the present invention. As described above, any type of motion detection may be used to determine whether the mobile station is in motion. When method 1100 is deployed, measurements of received beacon signals, as well as other parameters, may be received by the positioning engine, in the context of whether or not the mobile station is moving. Various techniques may be deployed to process received data based on whether the mobile station is stationary or moving, examples of which have been given above and are further detailed below.

Configuration

When a mobile device (i.e. tag) 170 or network monitor 120 is used for the first time, it may not have a WLAN configuration loaded. In some WLANs, the access points may continually broadcast configuration messages (which may be used as or contained in beacons) whereby each beacon may include WLAN configuration information. When a mobile device or network monitor receives this information it may modify its configuration so that it can attach to this WLAN access point. However, since there may be multiple WLANs, the device may need to select a WLAN to which it should attach. In one embodiment, the device may choose a WLAN randomly from those available. In an alternate embodiment, the device may listen for all wireless networks and attach to the wireless network with the highest signal strength. In another example embodiment, the mobile device or network monitor attaches to a predefined WLAN as described below. Any other method of configuration may be deployed as well.

In one embodiment, a device, such as a mobile device or network monitor, is preconfigured with WLAN settings. These settings may include information necessary for a device to communicate on the WLAN, for example network name and security settings. Security certificates or authentication information may be included as well. In one embodiment, a WLAN in the environment may be configured with the same settings that are preconfigured on the mobile device or network monitor. This WLAN is typically attached to a computer, which stores additional configuration information. When the device is instructed to download new configuration information (for example, it was powered on or reset) it connects to the preconfigured WLAN and requests configuration information from the computer attached to this WLAN. The computer then replies with configuration information for the device. The device may then change its settings to the newly downloaded configuration information and may switch to a different WLAN. In this example, the computer receiving the request from the device then sends the request to a central server, which replies with the configuration information. In one embodiment, devices that have been configured and are on the WLAN may be used to configure other devices, which have not yet been configured. In this manner, the devices may be self-configuring, by communicating with other devices, and the computer described above is not necessary. Once properly configured, any device (a tag, a network monitor, a computer, an access point, a beacon emitter, etc.) may be used to update an unconfigured or incorrectly configured WLAN device.

Figure 12:
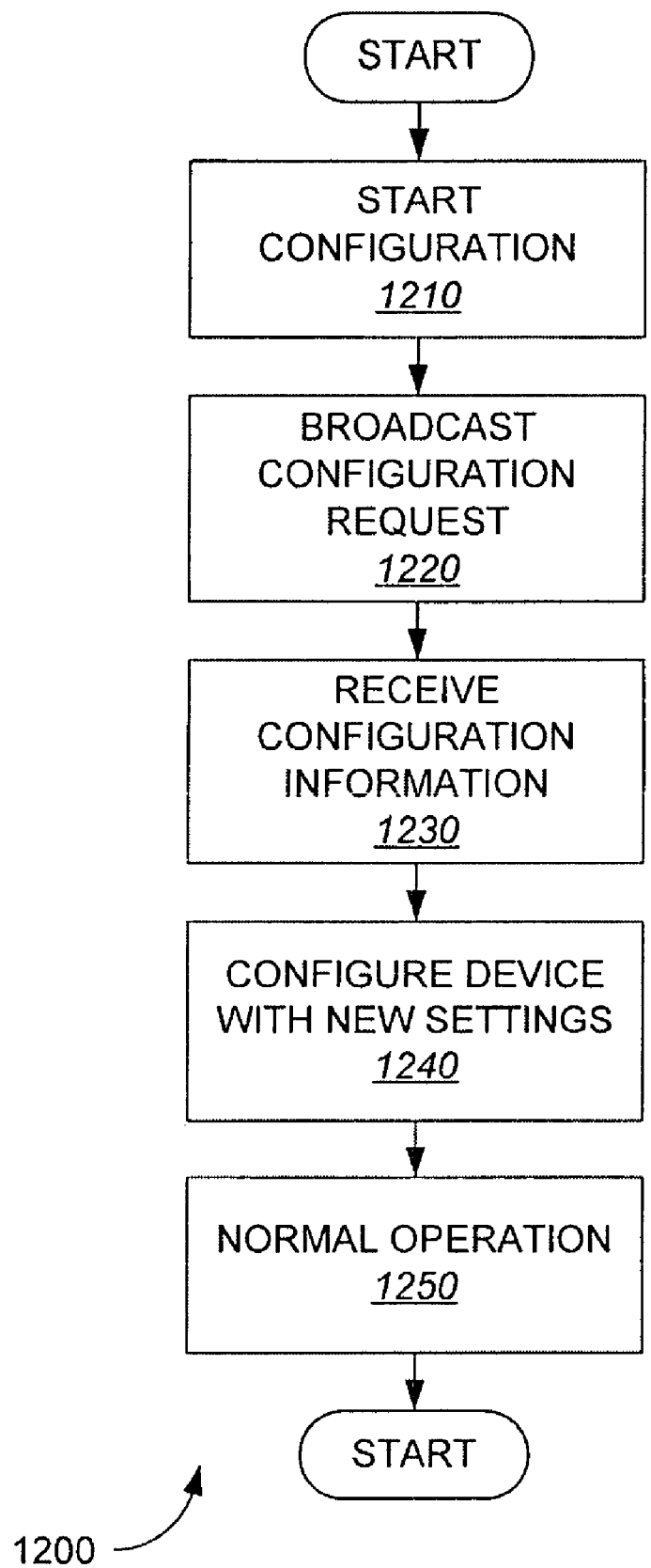
FIG. 12 depicts an example method for configuration of a device such as a mobile device or network monitor.

FIG. 12 depicts example method 1200 for configuration of a device (i.e., a mobile device or network monitor). At 1210, the device starts the configuration process. The configuration process may be initiated by a button being depressed, power being applied, timer expiration, etc. At 1220, the device finds a network that matches its preconfigured settings and broadcasts a message on the network, requesting configuration data. The device and the Configurator (configuring device or computer) may authenticate each other. At 1230, the device receives configuration information from the Configurator. In the example embodiment, the device verifies that the configuration information received is valid (i.e. matches a pre-computed checksum, cryptographic hash, or other data verification methods known in the art). At 1240 the device applies the newly received settings. In one embodiment, the device may restart. At 1250, using the new settings, the device starts or resumes normal operation.

In one embodiment, operational parameters of the device (including, but not limited to, any variable that affects tag operation) are set remotely and transmitted to the tag over the wireless interface. Operational parameters may include network settings, server settings, and performance settings. Network settings may include information about the wireless LAN, including settings that must be set to communicate on the wireless LAN. Server settings may include information about how to communicate with a positioning engine, such as network addresses of one or more positioning engines or the number of times to attempt to communicate with one server before failing over to another. Performance settings may include any other parameter that affects system operation, including alarm criteria, indicator criteria, location update frequency, whether to send location updates when movement begins or ends, motion sensor sensitivity, minimum time interval between updates, and other parameters that affect the operation of the device.

In one embodiment, one or more parameter values are stored as a mode. For example, one mode may include settings to operate with one WLAN and another mode may include settings for a different WLAN. The positioning engine may store one or more modes and instruct the devices to switch modes based on a user's command, time of day, or other events. In one embodiment, the mobile devices store the settings for various modes and the positioning engine instructs the device which of its stored modes to use. In an example embodiment, the positioning engine stores the settings for the modes and transmits the settings to the device when the device's mode is to be changed. If the device is on the WLAN, and is listening, then the positioning engine may transmit configuration information to the device immediately when the mode is changed. In one embodiment, the positioning engine transmits configuration information when the device requests. In this manner, the device's power consumption is minimized because the device is only listening for a short period after the device transmits the request. The device may be configured to request configuration information periodically (e.g. once per day), or according to other criteria, including alarm events as described previously.

Example configuration methods include those where the user specifies a value and this value is transmitted to the device either through the transceiver or through a cabled connection. One method to configure the WLAN device may be to allow the WLAN device to use a "web server interface" whereby a user (or software application) specified the IP address of the WLAN device into a web browser window. The web browser interface may then be used to configure the WLAN device parameters. Another method to configure the WLAN device attaching the WLAN device to a computer, whereby the user enters in values to the computer application and the application transmits these values to the device using a serial protocol. Yet another method to configure the WLAN device includes using a correctly configured device to configure the device needing configuration. This may be accomplished by placing the device to be configured in close proximity to a correctly configured device to allow the two devices to communicate using their transceivers, or connecting the two devices with a cable.

In one embodiment, applications running on a microprocessor in the device may be changed while the device is in use. For example, if a new version of the application is available, then it may be desirable to upgrade the application on the device to the new version. In one embodiment, the method to change the application includes connecting a computer with a cable to the device and sending the new application over the cable. In another embodiment, the device may be programmed by another device through the device's transceiver (for example if the transceiver incorporates an RFID interface). In the example embodiment, the positioning engine transmits the application over the WLAN to the device. The device may verify that the firmware is valid (with a checksum or cryptographic hash or other method known tin the art) prior to running the application. In one embodiment, the device measures its battery level and only updates the application if the battery level is sufficient for this operation.

Beacon Emitter

Figure 13:
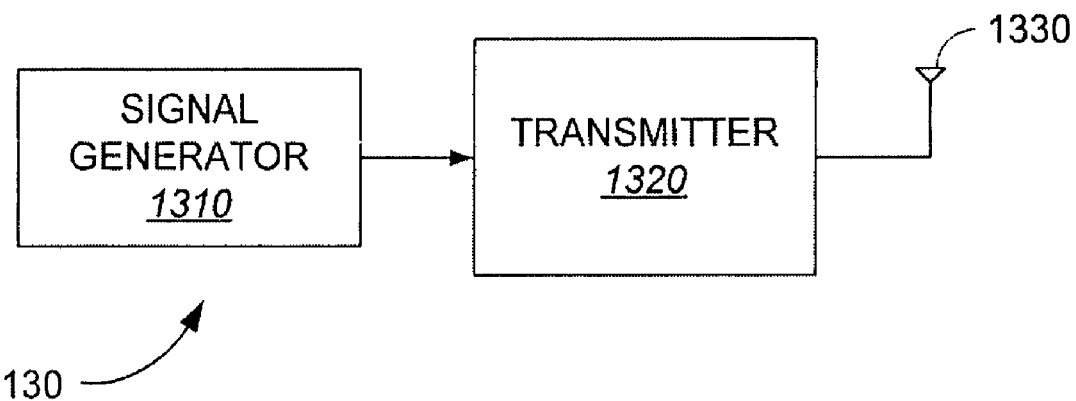
FIG. 13 depicts an example embodiment of a beacon emitter.

As described above, one or more beacon signals may be transmitted throughout a system 100 to be received and measured by various devices within the system, such as network monitors 120 or various objects 170. A beacon may be any known signal transmitted in accordance with any transmission format. For example, an access point may transmit an identifiable signal that may be used, in whole or in part, as a beacon signal for measurement by wireless devices within the network. However, a beacon emitter need not be capable of performing additional communication such as transceiving in accordance with a WLAN standard, as with an access point, or in performing network monitoring, such as a network monitor. FIG. 13 depicts an example beacon emitter 130 that may be deployed for use within system 100. Signal generator 1310 is deployed to produce a beacon signal. Transmitter 1320 receives the signal and transmits it via antenna 1330. Various other components of a beacon emitter may be included and are not shown in FIG. 13. For example, a beacon emitter may comprise a processor, a network interface, and various other components, examples of which have been detailed throughout.

As discussed above, a beacon signal need not be generated by the system, but any identifiable and measurable RF source may be used. Such a source may be received, measured, and the measurements used in updating the mapped space of the system environment for use in position location. Those of skill in the art will recognize myriad other configurations suitable for deployment as beacon emitter 130 within the scope of the present invention.

As discussed above, a beacon emitter may be coexistent with, or incorporated into, a network monitor. Thus, a network monitor/beacon emitter may transmit a beacon while performing network monitoring as well as any other function. In an alternate embodiment, a network monitor/beacon emitter may switch periodically between beacon transmission and network monitoring. A beacon emitter may also be part of an access point. In yet another alternative, a network monitor may serve as an access point and provide a beacon along with any other options described above with respect to network monitors.

A beacon emitter may or may not be conditionally programmable via a wired or wireless connection. In one embodiment, a beacon emitter is configured before deployment and left to transmit continually until it is physically disabled or removed. It may be desirable for a beacon emitter to have a fixed power supply connection. Alternatively, a beacon emitter may run on battery power. Techniques for communication over a power grid are known in the art and may be deployed for use with beacon emitters that are plugged into an outlet equipped with such a communication system.

Access Point

An example embodiment of an access point includes any device for communication with the positioning engine as well as one or more wireless communication devices within system 100. As described above, the access point may communicate with the positioning engine via wired or wireless connection. It may also support other wired or wireless connections to other devices within the network or within the system. In one embodiment, an example access point is configured to receive measurements wirelessly from mobile devices 170. In an alternate embodiment, an access point may receive measurements via a network monitor deployed in the system, either through a wired connection, or wirelessly. Those of skill in the art will recognize the myriad connections that may be deployed in light of the teaching herein.

An access point may have multiple interfaces to connect with various types of tags, each tag supporting one or more of various radio interfaces. An access point may be connected to the position location engine over a network or may be connected directly to the positioning engine. As described above, an access point may be collocated with or include the functionality of a network monitor or a beacon emitter.

Figure 14:
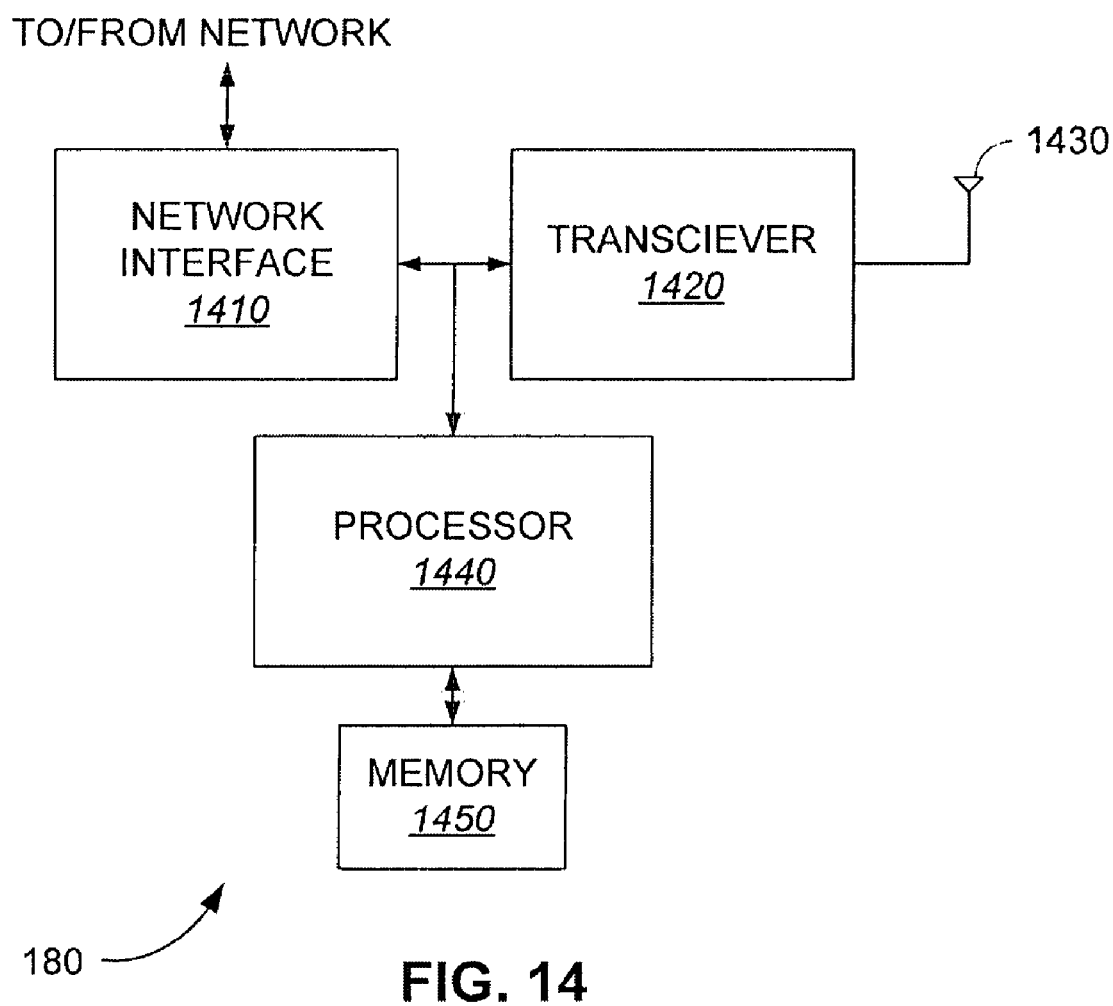
FIG. 14 depicts an example embodiment of an access point.

FIG. 14 depicts an example embodiment of an access point 180. Network interface 1410 is connected with a network. In this example, the network is the communication medium for receiving from and transmitting to the positioning engine. Data to and from the network may be transmitted via antenna 1430 by transceiver 1420. Transceiver 1420 is equipped to receive and/or transmit according to one or more communication standards. In one embodiment, the transceiver operates in accordance with an 802.11 specification. In an alternate embodiment, one or more additional transceivers may be deployed to support alternate communication standards. Processor 1440 is connected to memory 1450.

Processor 1440 may be a general-purpose microprocessor, a digital signal processor (DSP), or a special-purpose processor. Processor 1440 may be connected with special-purpose hardware to assist in various tasks (details not shown). Various applications (position based applications, for example, as well as any other type of applications) may be run on externally connected processors, such as an externally connected computer or over a network connection, may run on an additional processor within access point 180 (not shown), or may run on processor 1440 itself. Processor 1440 is shown connected with memory 1450, which may be used for storing data as well as instructions for performing the various procedures and methods described herein. Those of skill in the art will recognize that memory 1450 may be comprised of one or more memory components of various types, that may be embedded in whole or in part within processor 1440. One or more of the functions of transceiver 1420 and/or a network interface 1410, may be carried out in processor 1440 as well.

Positioning Engine

A positioning engine 110 may be deployed using a wide variety of location position determination techniques within the scope of the present invention. For example, a positioning engine may be used for two dimensional location determination, three dimensional location determination, may include multiple models, or may use multiple positioning engines within the positioning engine. Various examples of these techniques are detailed below.

Figure 15:
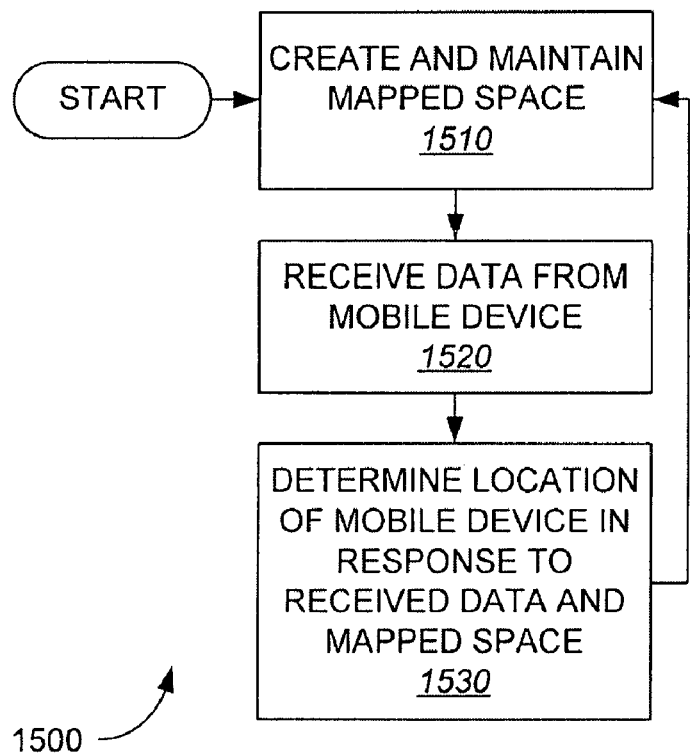
FIG. 15 is an example method for performing position location.

FIG. 15 depicts example method 1500 for performing position location. The process starts in block 1510 where the position engine creates and maintains a mapped space. Example mapped spaces are described above, and various additional alternatives are detailed below. In block 1520, the positioning engine receives data from a mobile device. The received data may be any of the various types described above. In block 1530, the location of the mobile device is determined in response to the received data and the mapped space. Then the process may return to block 1510. The process may repeat indefinitely.

Figure 16:
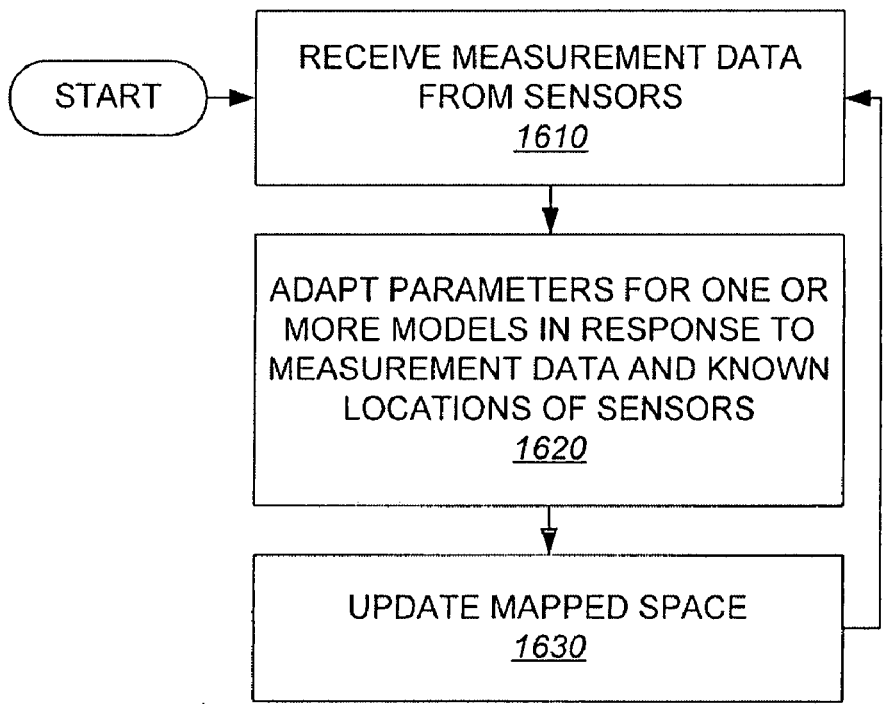
FIG. 16 depicts an example method for creating and maintaining a mapped space.

FIG. 16 depicts an example method suitable for deployment as block 1510 in method 1500, for creating and maintaining the mapped space. The process begins in block 1610 where the positioning engine receives measurement data from one or more sectors, as described above. In block 1620, the positioning engine adapts parameters for one or more models in response to measurement data and known locations of network monitors. Note that one or more parameters may be used for each of the one or more models. Parameter sets may be computed and indexed based on various other factors such as time, temperature, humidity, etc. Thus, the parameters for model selection may be adapted to changing environment variables, other than just the RF measurements. In an alternative embodiment, it may be that adapting the parameters in association with the known locations of the network monitors relatively frequently is sufficient to provide the desired accuracy of the position location. In such a case, there would be no need to index based on these other parameters, as the mapped space essentially is updated and tracked in accordance with all the relevant environment variables. In an alternate embodiment, the positioning engine may also adapt the values associated with measured static calibration points in accordance with measurements from the network monitors as well as mobile devices 170. In block 1630, the positioning engine updates the mapped space in accordance with the adapted parameters. Depending on the model or models deployed, the mapped space may be updated differently.

Figure 17:
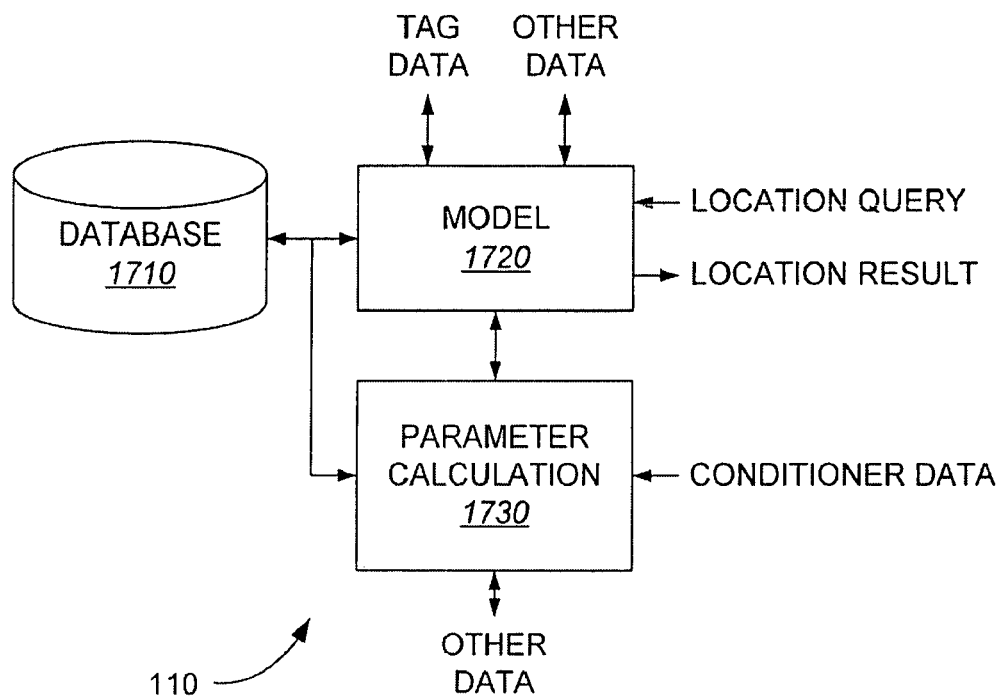
FIG. 17 depicts an example embodiment of a positioning engine.

FIG. 17 depicts an example embodiment of a positioning engine 110. Model 1720 receives tag data as well as other data, examples of which are detailed above, and is used to determine a position for the particular tag in accordance with data stored in database 1710. A database may include, but is not limited to, known locations of calibration points, both static and dynamic, past and present location estimates for one or more objects, functions, parameters, etc. for use in position location, and may include any media storage such as a hard disk, memory, removable media, floppy disks, CD-ROMS, etc. Model 1720 may be used periodically to store the position for each tag. Or, the position for each tag may be determined in response to a location query. In either case, a location result may be generated in response to a location query for one or more assets being tracked by system 100. Database 1710 may store any number of past locations for each asset being tracked as well as other environment data recorded. The location result is determined according to the model based on the measured data from a tag in accordance with the varying parameters, maintained in database 1710 as updated. In other words, database 1710 is one embodiment comprising an updated mapped space. The space is updated by parameter calculation block 1730 which receives network monitor data, as well as other data, as described above.

In association with model 1720, parameters for use with the model may be computed or refined based on the network monitor data, in association with the known location for a given network monitor. For example, a position location model 1720 using the latest calculated parameters receives measured data from a network monitor and determines a location therefrom. If that position is different from the known location, the parameters may be updated so that the model returns the correct location for that network monitor (or, the overall error may be optimized according to some method, such as minimizing least squared error). This may be performed for all of the network monitors within the system. Various parameters are known for different position location models, and any such model may be deployed.

Figure 18:
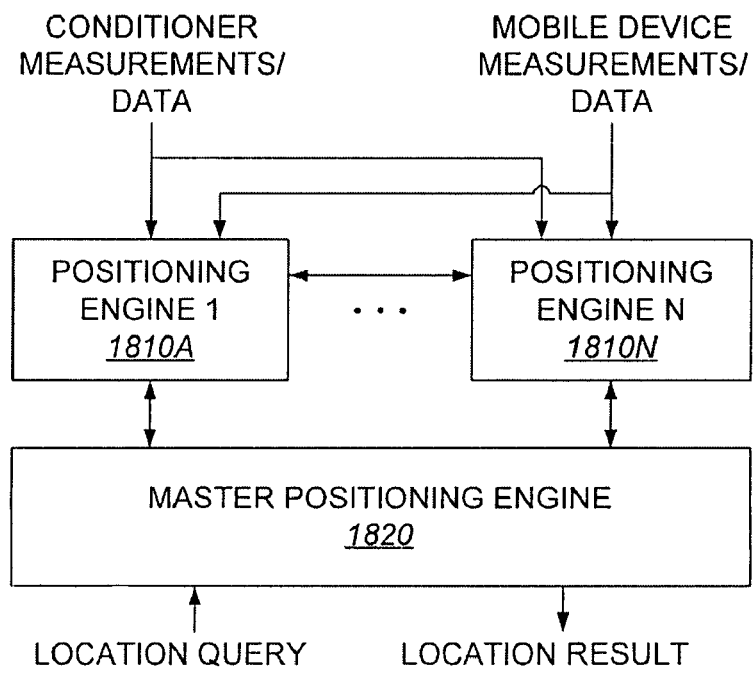
FIG. 18 depicts an alternate embodiment of a positioning engine.

FIG. 18 depicts an alternate embodiment of a position engine 110. In this embodiment, a master positioning engine 1820 is deployed which receives location queries and provides location results, as before. However, in this embodiment, multiple positioning engines 1 through positioning engine N (1810A-N) are deployed as well. Master positioning engine 1820 interacts with these sub-positioning engines, and each sub-positioning engine may also interact with each other. A positioning engine 1810 receives network monitor measurements and data, as well as mobile device measurements and data, in order to update parameters associated with the models deployed in each positioning engine. A positioning engine 1810 may also make determinations of a tracked asset, i.e. an object 170, in response to mobile device measurements and data. Thus, each positioning engine 1810 may use a different model for position determination.

The master positioning engine 1820 may also incorporate a method for combining the results of the various location engines 1810. For example, results that may be valid from one model may be inconsistent with the results from another model. Various techniques, such as averaging the estimates of the location, removing outliers based on extrinsic knowledge, and the like, may be deployed to increase the accuracy of the location determination. Variances between the various position location engines may also be used to estimate the uncertainty of the location result, or alternatively the confidence level.

Figure 19:
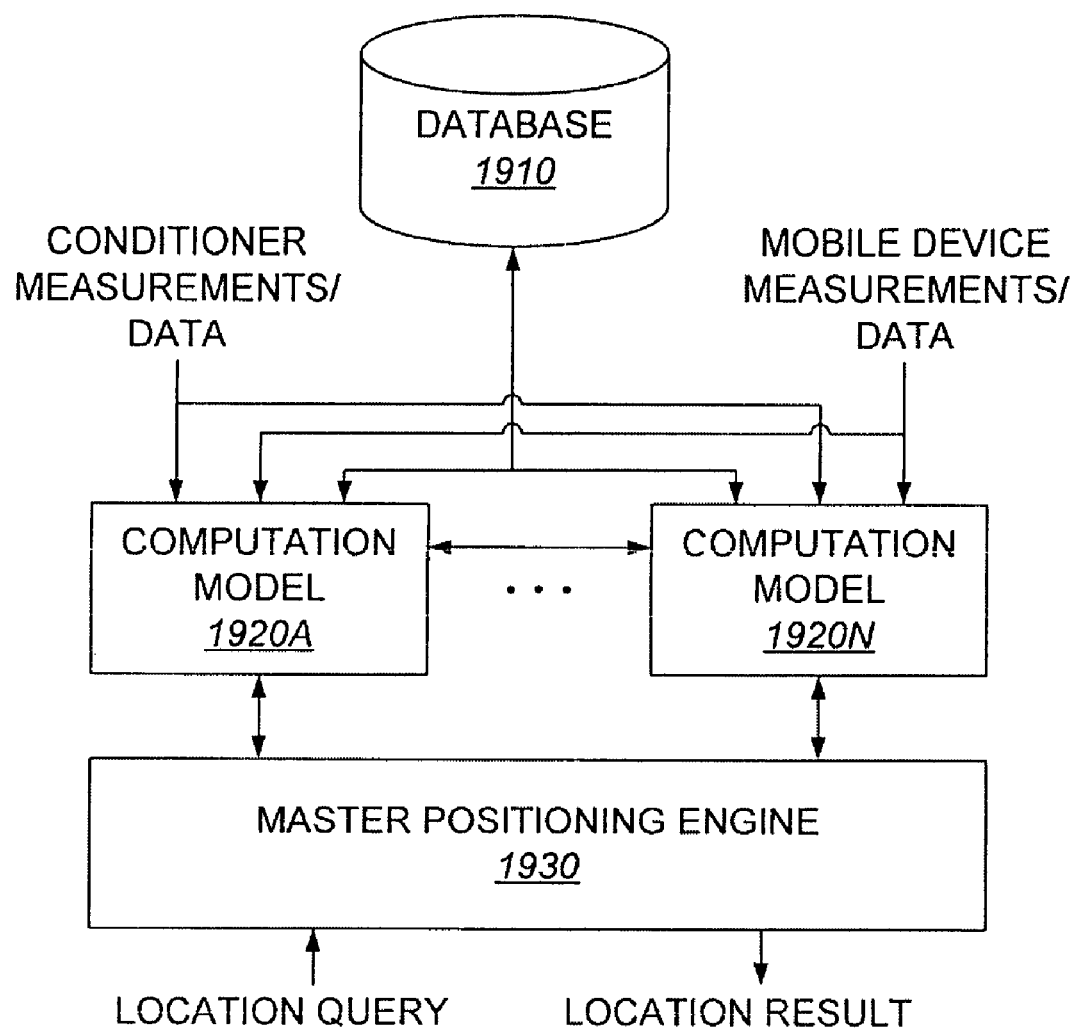
FIG. 19 depicts yet another alternate embodiment of a positioning engine.

FIG. 19 depicts yet another alternate embodiment of positioning engine 110. Again, a master positioning engine 1930 is deployed, this time communicating with various computation models 1920A-1920N. The computation models 1920 may interact with each other as well as the master positioning engine 1930. Each computation model 1920 may receive network monitor measurements and data, as well as mobile device measurements and data. Various models may require subsets of the available data, depending on the model deployed. Database 1910 may be accessed by the various computation models and updated in accordance with parameter estimation, as described above, using network monitor data and the known locations of network monitors, as well as other data and extrinsic evidence. In alternative embodiments, database 1910 may be comprised of one or more databases, each database accessible by one or more computation models 1920.

In one embodiment, to compute the location of a mobile device, a positioning engine 110 may compare the RF data received from a mobile device (mobile data) with the RF data stored in the RF data map (i.e. mapped space or database) to find the nearest calibration points. The positioning engine 110 may use the actual locations of those calibration points to determine the actual location of the mobile device. As described above, the RF data map may have a plurality of calibration points, with each calibration point consisting of RF data and the actual location of that point. The RF data may consist of one or more datum, such as S1, S2, S3, ... SN. Each datum is a measurable quantity of the RF environment, as previously described that may or may not be independent of another datum. RF data may include RF noise at a particular frequency, air temperature, beacon signal strength from a particular access point, etc. To determine the calibration points that are most similar to mobile data, one or more of the following methods may be employed. These methods are illustrative only, and will be well known to one of ordinary skill in the art.

Nearest Neighbors in Signal Space (NNSS): In this method, the distance in signal space may be computed between the mobile data and each calibration point RF data. All calibration points may be ranked, with the nearest calibration point (i.e. the calibration point with the smallest distance in signal space to the mobile data) being ranked the highest and the farthest (i.e. the calibration point with the highest distance in signal space to the mobile data) being ranked the lowest. Note that the distance in signal space may not correspond to Euclidian distance, as there may be a plurality of calibration points that are nearby in signal space but far away from each other in Euclidian (physical) space.

Weighted Nearest Neighbors in Signal Space (WNSS): This method is similar to NNSS but each datum (S1, S2, S3, S4, etc) is not used equally in determining distance. Instead, the more reliable data points (i.e., those with the least variance, those with the highest levels, or other statistical methods to determine the most reliable data, as will be obvious to those skilled in the art) are weighted more in determining distance. In this fashion, the nearest neighbors are computed based on more reliable data points instead of treating each data point equally (in contrast to NNSS).

Each of these methods may return a list of the calibration points nearest (i.e. most accurately representing in signal space) the mobile data. This list may include the weighting factor of each calibration point, representing how close the calibration point is to the mobile data. To compute the actual location of the mobile device, the positioning engine may compute the weighted average of the locations of each calibration point based on their weighting factor. In this manner a location coordinate may be obtained.

As described above, various position location modeling techniques may be deployed in embodiments described throughout this specification. Any model may be used, as the principles of the present invention are not limited to any particular model, or set of models. Several example models are described below, including neural networks, Bayesian filters, and Kalman filters. Those of skill in the art will readily apply these and other modeling techniques to various embodiments, in light of the teaching herein.

A neural network is a software algorithm that computes an output value from one or more input values. The computation function is determined (or learned) from a set of training data. The training data consists of input values with a corresponding correct output value. In an example embodiment, the input data consists of RSSI data from network monitors and the output value is the location of the network monitor. In another embodiment, the input data consists of RSSI data recorded from mobile devices and the output value is the manually recorded location of the mobile device. After this training data has been entered into the system, the system creates the function (or model) at which point the system is said to be trained. When the system receives input data it uses this function to determine the output. In a positioning system, the input value includes information received from mobile devices and the output value is the computed location of the mobile device.

The system may be retrained periodically based on input data from the network monitors. This retraining may record data from the network monitors for a period of time and retrain the system using this set of data. In one embodiment, data from the network monitors is recorded for a time period and the model is retrained using a combination of this set of data and the set of data previously used to retrain the model. In this manner, the system is constantly adjusting for changes in the RF environment and updating the model appropriately. The combination of old data and new data may be accomplished using an averaging technique, Bayesian Filtering, Kalman Filtering, Hidden Markov Modeling, or other statistical methods known in the art.

Bayesian Filters consist of a number of nodes, or states, with links between each node based on the probability that one state will lead to another, based on the values of past states. In a positioning system, a Bayesian Filter computes the probability that a mobile device is at one or more locations based on the inputs received from the mobile device. From this information the final location of the mobile device may be calculated.

Measuring a quantity often results in a value and an error. Measuring a quantity that does not change may produce several values, each with a different error. Kalman filtering is a method to combine several measurements based on their value and error. Kalman filtering performs a weighted average of the measurements. The weight assigned to each measurement is inversely proportional to its error-a value with a high amount of error will be weighted less than a value with a low amount of error. In positioning systems, this method is used to determine a location from the combination of multiple location calculations, each location calculation having a corresponding amount of error and the resulting error is smaller than the first measurement's error.

The Hidden Markov Model is a finite set of states, each of which is associated with a (generally multidimensional) probability distribution. Transitions among the states are governed by a set of probabilities called transition probabilities. In a particular state, an outcome or observation can be generated, according to the associated probability distribution. It is only the outcome, not the state, that is visible to an external observer and therefore states are "hidden" to the outside. In positioning systems, this method is used to determine a location (a state) from the information received from the mobile devices and calibration points.

Figure 20:
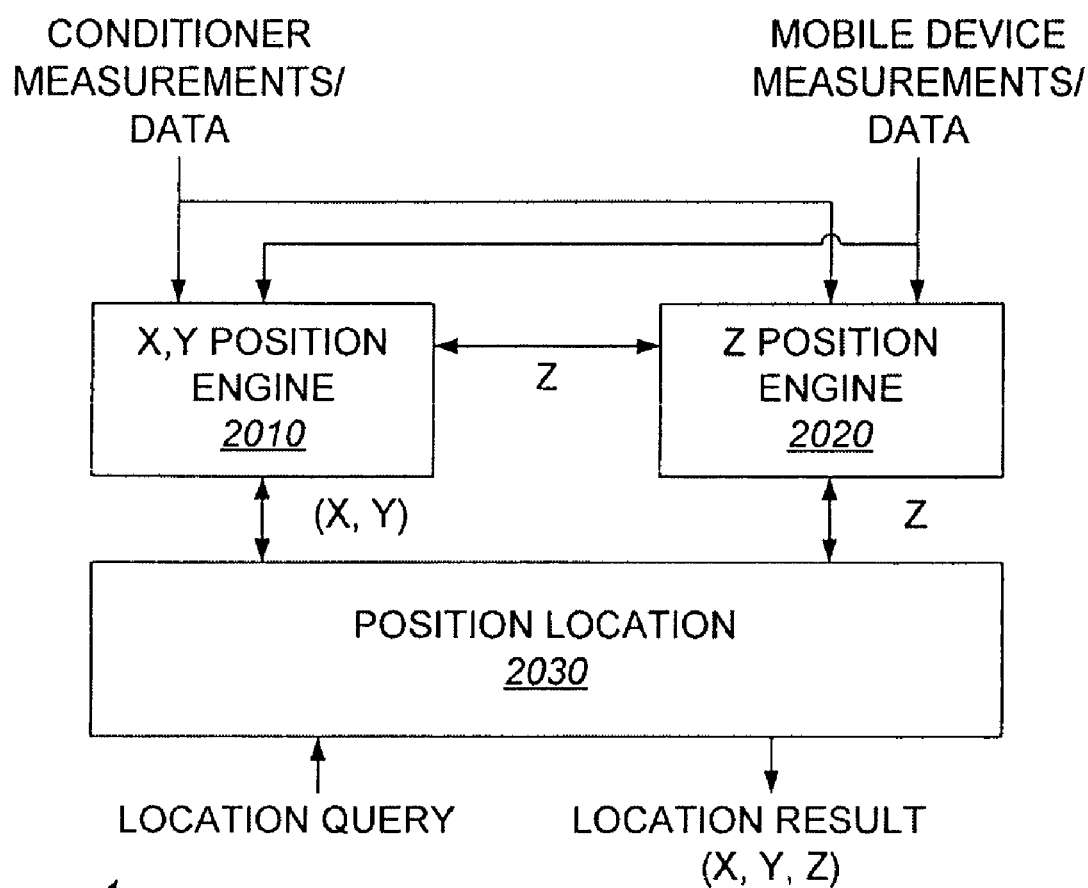
FIG. 20 depicts another alternate embodiment of a positioning engine.

FIG. 20 depicts an alternate embodiment of positioning engine 110. In this example, position location block 2030 receives location queries and provides three dimensional location results. In an alternate embodiment, not shown, a position location engine may compute three-dimensional locations directly from received measurements from network monitors and mobile devices. In an example embodiment, a two-dimensional (X, Y) position engine 2010 is deployed to receive network monitor measurements and data and for updating a two-dimensional mapped space for each of one or more third-dimension values. A Z position engine 2020 determines the Z position estimate. This estimate may be determined in response to mobile device measurements, network monitor measurements as well as various other data. (X, Y) position engine 2010 may maintain a map of the space for each value Z (or for a range of values Z), which may be updated in accordance with the techniques described herein. Thus, (X, Y) position engine 2010 returns an X, Y position location in response to the output of the Z position engine 2020, as well as the measured mobile device parameters and data (in accordance with the updated mapped space). Position location 2030 receives the X and Y parameters from position engine 2010 and the Z parameter from position engine 2020 and produces a three-dimensional location result.

One example for deployment of this embodiment would be a multifloor building. The Z position engine may attempt to determine which floor a device is on based on network monitor measurements and data, or other items, or any combination thereof. For example, an elevator may be used with a device for detecting mobile devices entering and exiting. Thus, the elevator may be used to determine the floor on which each tracked device is located.

Error Estimation and Accuracy Enhancement

A variety of techniques may be deployed with various positioning engines to provide enhanced accuracy or indicate an error estimate or confidence level. With respect to multiple position engines, as detailed above with respect to FIGS. 17-19, a master positioning engine may take the average or weighted average of one or more of the positioning engines or models, or may deploy a selector for selecting one or more subsets (and optionally averaging those as well). Various other filters for accuracy may be deployed. For example, maps containing barriers such as walls and doors, which may be open or shut, may be used to increase accuracy. In such a case, the positioning engine may receive signals from doors equipped to transmit whether they are open or closed. In an alternate embodiment, it may be assumed that any door may be openable but walls may not be traversed. The positioning engine may also calculate the likelihood of a door being open or closed based on prior location or movement patterns of one or more objects. In another example, if a device moves into an area known to be an elevator, it may trigger an expectation that a change in the Z-axis computation may be in order. Various other techniques such as these will be apparent to those of skill in the art in light of the teaching herein. Tag-based motion detection techniques, described above, may also be deployed to increase the accuracy and/or determine the error component of various positioning techniques. Example embodiments are detailed below.

Figure 21:
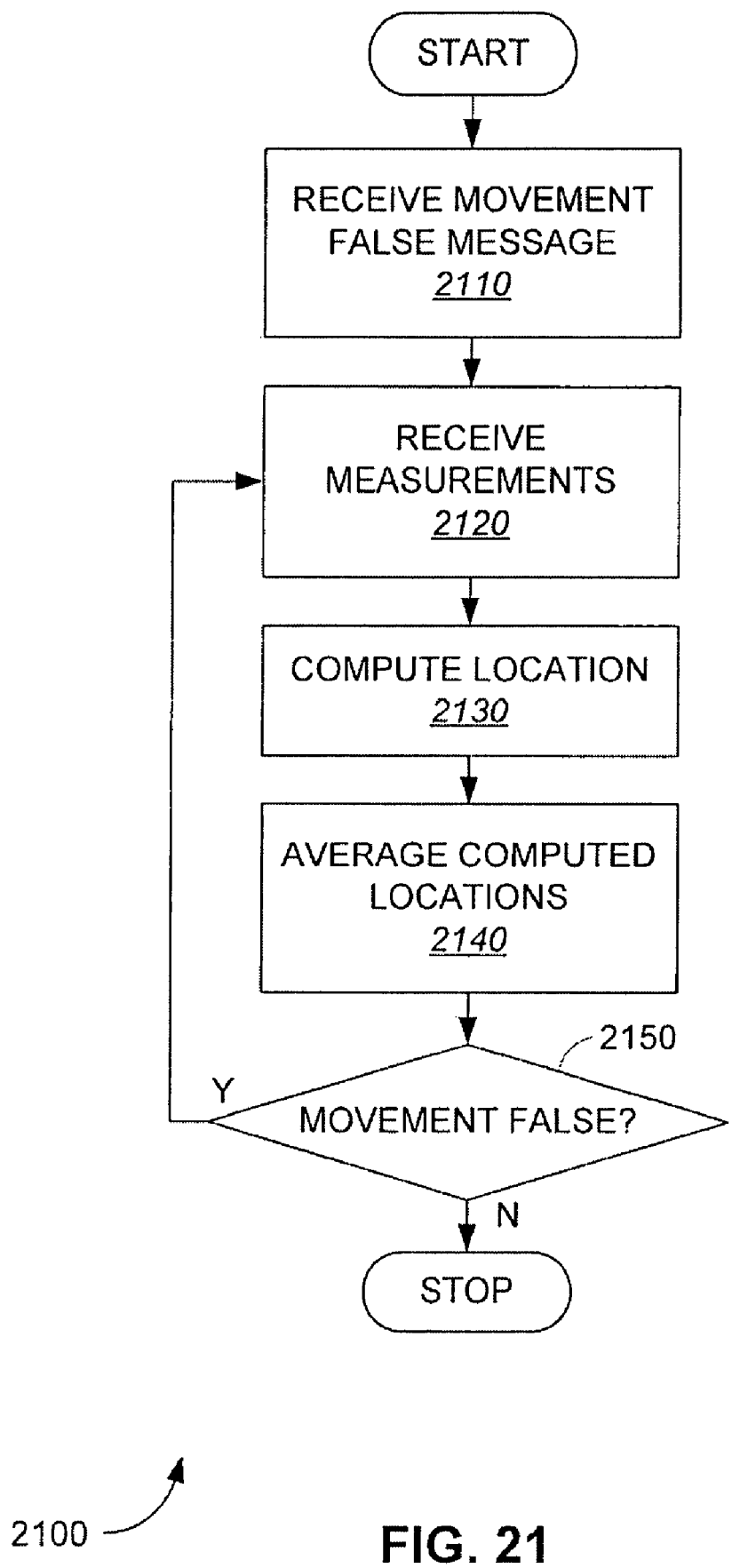
FIG. 21 is an example embodiment of a method for determining an average location of a mobile device that is not moving.

FIG. 21 depicts an example embodiment of a method 2100 for determining an average location of a mobile device that is not moving. Method 2100 is one example for which Kalman filtering is particularly well suited. The process begins in block 2110 where the positioning engine receives a movement false message. This may be generated using any of a variety of techniques, examples of which are detailed with respect to tag 170 above. In block 2120, measurements are received from the tag, which has indicated it is not moving. In block 2130, a location is computed based on the received measurements as well as the updated mapped space. In block 2140, the computed location is averaged with any previously computed locations during the period of time that the tag has indicated it is not moving. In decision block 2150, if the tag has not moved, indicated by a movement variable set to false, proceed to block 2120 to repeat a new measurement and location computation.

For a device that is not moving, any change in the computed location of the device would be due to changes in the RF environment and thus, by averaging the computed results of a stationary device, the variability of the changing environment may be reduced or eliminated. By measuring the amount of variance of the location and/or the measurements from a tag, an estimate of the error and/or variability of the RF environment in that general location may be computed. This information may be used to indicate the confidence level of measured and computed locations throughout the system. The measured variance of the variables of a stationary object 170 may also be used as an estimate of the uncertainty of the location of other objects 170 which are in close proximity to a stationary object.

In an example embodiment, any error estimating techniques may allow for indexing based on one or more environment conditions. For example, if, using any technique, expected error levels change corresponding to changes in humidity, then a measurement of the humidity by a network monitor, tag, or other device, may be used to estimate the expected error. This technique may be expanded for use with multiple environment variables.

Figure 22:
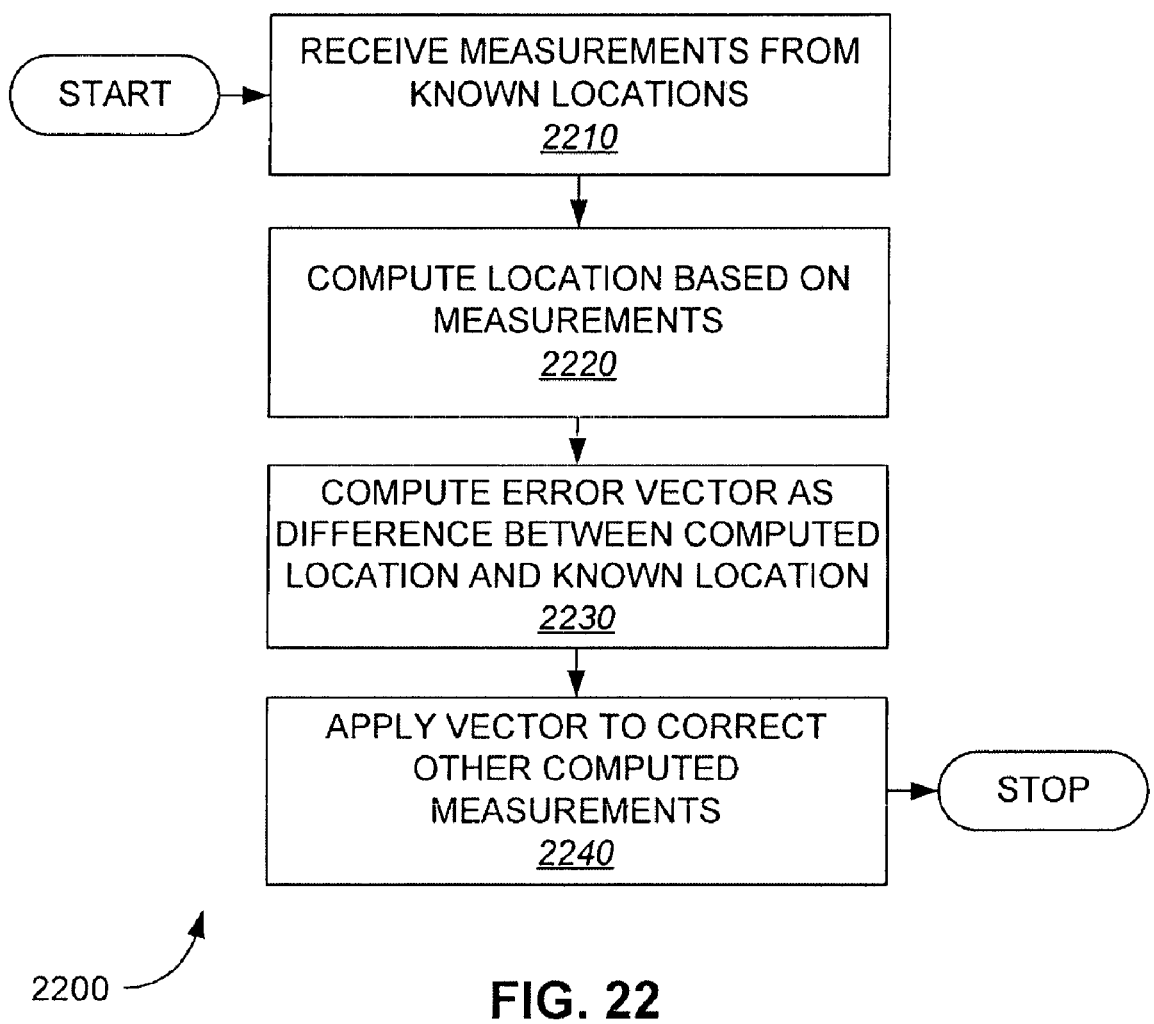
FIG. 22 depicts an example method for performing correction to computed measurements.

FIG. 22 depicts an example method 2200 for performing correction to computed measurements. The process begins at 2210, where the positioning engine receives measurements from known locations, such as network monitors. At 2220, the positioning engine computes the location of the known location devices based on the measurements from those devices. At 2230, the positioning engine computes an error vector as the difference between the computed location and the known location. At 2240, the positioning engine applies a vector to correct other computed measurements, the vector generated in accordance with the computed error vector. Then the process may stop. The method 2200 may be repeated periodically as often as desired for the required level of accuracy.

Figure 23:
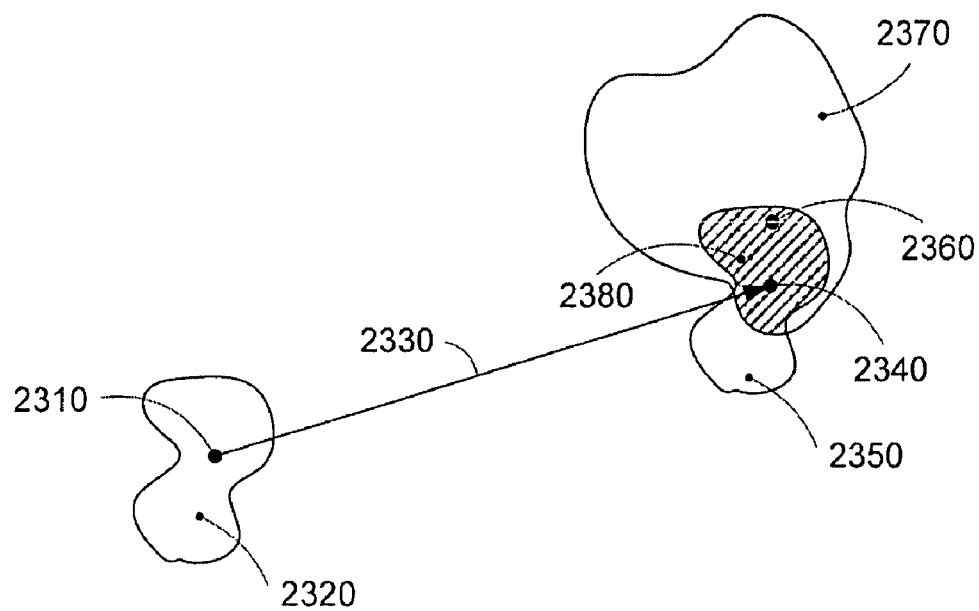
FIG. 23 depicts a variety of techniques for using a displacement vector in determining a new computed location.

As described above, with respect to FIGS. 8-11, a tag 170 may compute a displacement vector. FIG. 23 depicts graphically a variety of techniques a positioning engine may deploy to use a displacement vector 2330 in determining a new computed location. In this example, a tag 170 is determined to be located at point 2310. Thus, subsequent to movement by the amount indicated by displacement vector 2330, the resulting location would be given by point 2340. In one embodiment, a displacement vector may also incorporate an uncertainty term or terms to accommodate for inaccuracy of computing the displacement vector. This detail is not indicated in FIG. 23, although this could be accomplished by identified a region or area associated with the expected location in accordance with the variance of the value of displacement vector 2330.

Another technique identified in FIG. 23 is that, rather than using a single point 2310 to identify the location of the tag 170, area 2320 may be used to indicate the expected location. The expected location may be a conglomeration of the results of a variety of positioning engines, or uncertainty as calculated by error vectors, or variance in the RF environment, or any combination of the above. Area 2320 may indicate a region of equal likelihood of location of tag 170, or area 2320 may be subdivided into more and less likely portions (details not shown). Accordingly, and ignoring the effects of uncertainty in computing displacement vector, the effects of which may be accounted for by one of ordinary skill in the art, applying the displacement vector 2330 to area 2320 would result in an expected location given by the area 2350. Thus, a first technique for using area 2320 with a displacement vector would be to determine an expected location based on those two factors.

In addition, a new location for tag 170 in this example may be computed using one or more position location algorithms, models, or engines. In this example, the expected location as computed by the positioning engine, is given by point 2360. Note that in this example, that location is different from the point determined by 2340. This may be due to inaccuracy in the position location vector 2330, inaccuracy in the original location 2310, or inaccuracy in the computation of the final location 2360. The positioning engine can use any technique to combine results from one or more position algorithms, such as the displacement vector technique described above, and any other position location technique for which point 2360 is determined.

Consider an example in which a larger area in which the location of the asset or tag 170 may be located surrounds point 2360, identified as area 2370. Another technique, to combine the displacement vector with the calculated area, is to compute the intersection of area 2370 with the displacement vector area 2350 to narrow down the expected location. This overlap is indicated by shaded area 2380. Note that, in this example, both expected points 2340 and 2360 reside within the overlap area 2380. In other examples this may not be the case.

Figure 24:
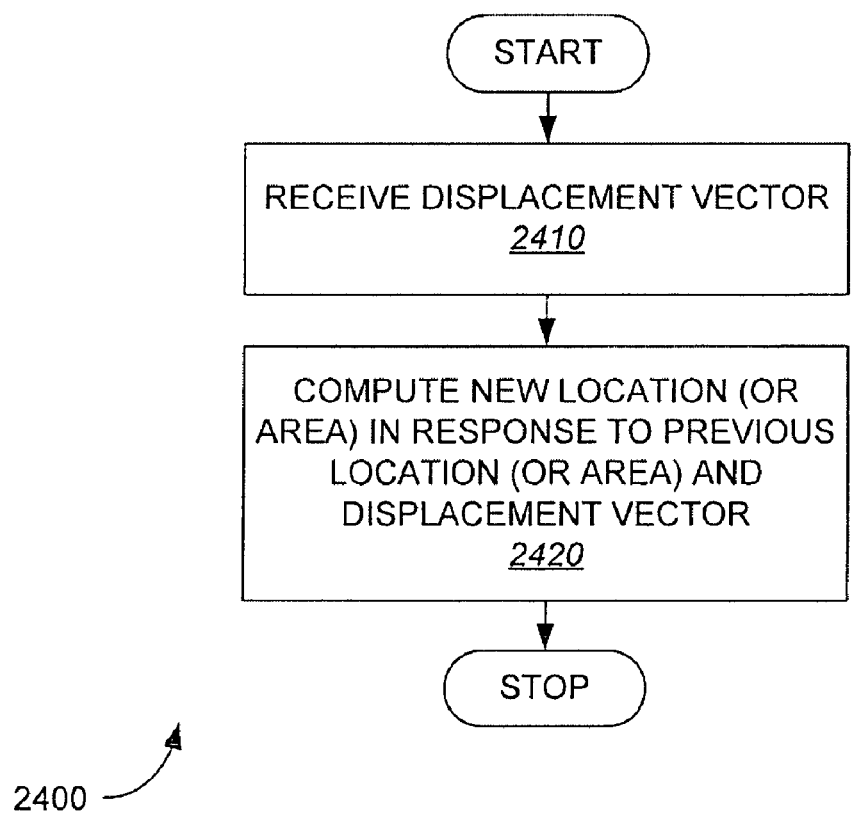
FIG. 24 is an example method for applying a displacement vector to refine decision location results.

FIG. 24 depicts example method 2400 for applying a displacement vector to refine decision location results. The process begins block 2410, where the position engine receives a displacement vector from an asset to be tracked (i.e. object or tag 170). In block 2420 the positioning engine computes a new location (or area) in response to a previous location (or area) and the received displacement vector.

Figure 25:
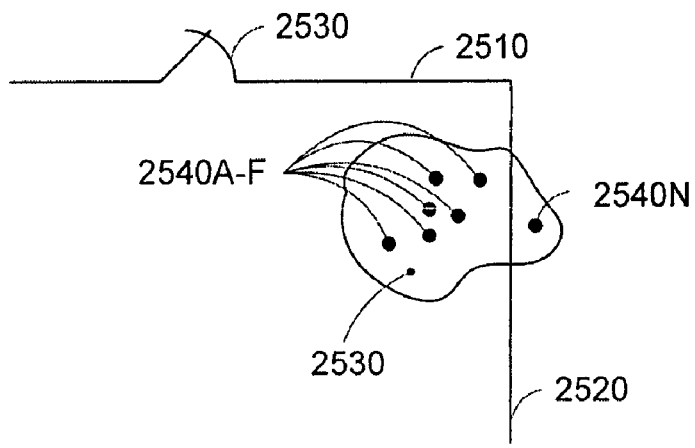
FIG. 25 illustrates the use of known barriers to refine positioning estimates.

FIG. 25 illustrates the use of known barriers to refine positioning estimates. In this example, the positioning engine is aware of various barriers to movement. For example, wall 2510 is connected to wall 2520. Door 2530 allows motion through barrier 2510. In a series of computations for location of a device, a series of hypotheses or estimates 2540A-F may be generated. Estimates 2540A-F are located within the room formed by walls 2510 and 2520, and one estimate 2540N is outside of the wall. By using knowledge of the barrier 2520, a position engine can exclude the hypothesis or estimate 2540 N. Note further that if a signal from a door 2530 can be sent to indicate whether it is open or closed, other expected movements by an asset in the room identified by walls 2510 and 2520 may be similarly filtered for accuracy. In addition to the techniques described herein, sensors may be deployed throughout a facility that detects the presence of a tracked asset as it passes. Information from such sensors may also be fed back to filter out improbably estimates based on these, presumably more reliable, location detections.

In an alternate embodiment, the number of estimates at a certain location may be used to indicate the probability of being located at that location. Returning to FIG. 25, consider area 2530 containing hypotheses or estimates 2540. To the extent that a series of measurements show a device in a smaller area, the probability of those estimates being correct may be higher to the degree that the number of measurements at that location is made. Thus, for example, if one estimate 2540 falls outside a series of estimates clustered together, a lower probability may be assigned to that location.

Techniques for computing displacement vectors, using knowledge of barriers, concentration of measurements, and history of movement to refine location estimates are detailed in the following paragraphs. Examples are also given. Those of skill in the art will readily apply one or more of these techniques, or combinations thereof, to the various embodiments detailed throughout this specification.

For mobile devices that have a motion sensor that measures acceleration in one or more directions (i.e., an accelerometer), then the distance traveled by the device may be computed to find the acceleration-calculated distance. The value of this acceleration, integrated over time, may be used to calculate, the distance traveled by the mobile device. If the acceleration is a function, then the distance traveled may be computed by taking the double integral of the acceleration function with the bounds set at the time interval that the function applies.

If the mobile device measures acceleration in more than one dimension, then the acceleration-calculated distance may be found by measuring the distance in each dimension. In this case, the acceleration-calculated distance may have multiple dimensions (for example, an x and y and z value) or these dimensions may be used to calculate a single distance by using the distance, d, given in equation 2:

$$d=\sqrt{x^2+y^2+z^2} \qquad (2)$$

If the distance between one location calculation and a successive location calculation is determined to be different from the acceleration-calculated distance, then the system may use the acceleration-calculated distance to refine the location calculation. For example, if a mobile device is located at (2,2), and the acceleration-calculated distance is at (3,1), then the new location would be (5,3). If, instead, the positioning engine calculates the location of the device at (5,1), then the system may use the acceleration-calculated distance to correct the calculated distance by reporting the new location at (5,3) instead of the value (5,1). In this manner, a more accurate location may be found.

The multi-dimension correction method just described (measuring the acceleration-calculated distance in its component dimensions) works well when the mobile device remains consistently oriented with the space. For example, if the mobile device is measuring acceleration in X, Y space, then for the multi-dimensional correction method above to work, the X direction of the accelerometer would need to be oriented in the X direction of space and the Y direction of the accelerometer would need to be oriented in the Y direction of space. However, normally mobile devices may be rotated when used, so a way to measure the direction of rotation of the mobile device may be desired. If a mobile device includes a method to determine the heading that the mobile device is oriented (including using a way to detect the earth's magnetic field (compass) or using directional antennae), then the system has knowledge of the mobile device's orientation and may correct the acceleration-calculated distance in each direction based on the measured heading.

For example, if the device measures an acceleration-calculated distance of x=3m, y=4m but the heading measurement device determines that the mobile device is rotated 180 degrees, so that its acceleration detector's x axis is pointed in the -x axis of space, and its acceleration detector's y axis is pointed in the -y axis of space, then the system may correct the acceleration-calculated distance to yield an acceleration-calculated distance of x=-3m, y=-4m in space. In this manner, the system may use heading measurement and multiple dimensions of acceleration measurement to compute the vector (in direction and magnitude) of all mobile device movement. When combined with one or more known locations, the system may compute where the device is located at all times.

If the mobile device is located in a predefined environment (e.g. a building) then the system may use a map of this environment to enhance the accuracy of locations computed by the positioning engine. A map of this environment may show the location of walls, doors, elevators, windows, mountains, bodies of water, and other features that affect the propagation of RF Data in the environment. (One simplified example is depicted in FIG. 25) In one embodiment, the locations of walls are used to enhance accuracy of mobile devices in a building. For example, if the system computes a location of a mobile device inside a room, but the next computed location is on the other side of a wall, then the system may use the knowledge of that barrier to compute the probability that the mobile device actually moved to the other side of the wall.

Example factors that may influence whether a mobile device moves through a barrier may include one or more of the following: (a) the distance to travel around the barrier and the speed at which the object would need to be moving in order to travel that distance during the time interval between the two location computations; (b) the probability that the barrier is closed (for example, a wall may have a lower probability of being closed than a wall); (c) the error in the location calculation on both sides of the barrier; (d) the number of location calculations on both sides of the barrier.

If the distance to travel around the barrier is known or able to be determined, then the system may compute the speed at which the object would need to be moving to travel around the barrier. If that speed is above a threshold, the system may determine that the mobile device is not actually on the other side of the barrier. If the probability that the barrier is closed is very high, then the system may conclude with a high degree of confidence that the mobile device is not actually on the other side of the barrier. Conversely, if the probability that the barrier is closed is very low (for example, if the barrier is a door that is usually open), then the system may conclude with a high degree of confidence that the mobile device is on the other side of the barrier. If the error in the location calculations on one side of the barrier is small, but the error in the location calculations on the other side of the barrier is relatively large, then the system may conclude with a high degree of confidence that the mobile device is not actually on the other side of the barrier. If there are a high number of location calculations on one side of the barrier, but fewer location calculations on the other side of the barrier, then the system may conclude with a high degree of confidence that the mobile device is not actually on the other side of the barrier.

If the system has a historical record of a device's movement, then the system may compute the probability that that device has moved through a barrier, and therefore the probability that the barrier is closed may be calculated. This may be applied to all objects of a particular type in the system to compute the probability that a barrier is closed for that type of objects. This may also be applied to all objects in the system to compute the probability that a barrier is closed for all objects. In this manner, the system may learn from historical location, data and, as a result, its new location computations may be made more accurate.

Figure 26:
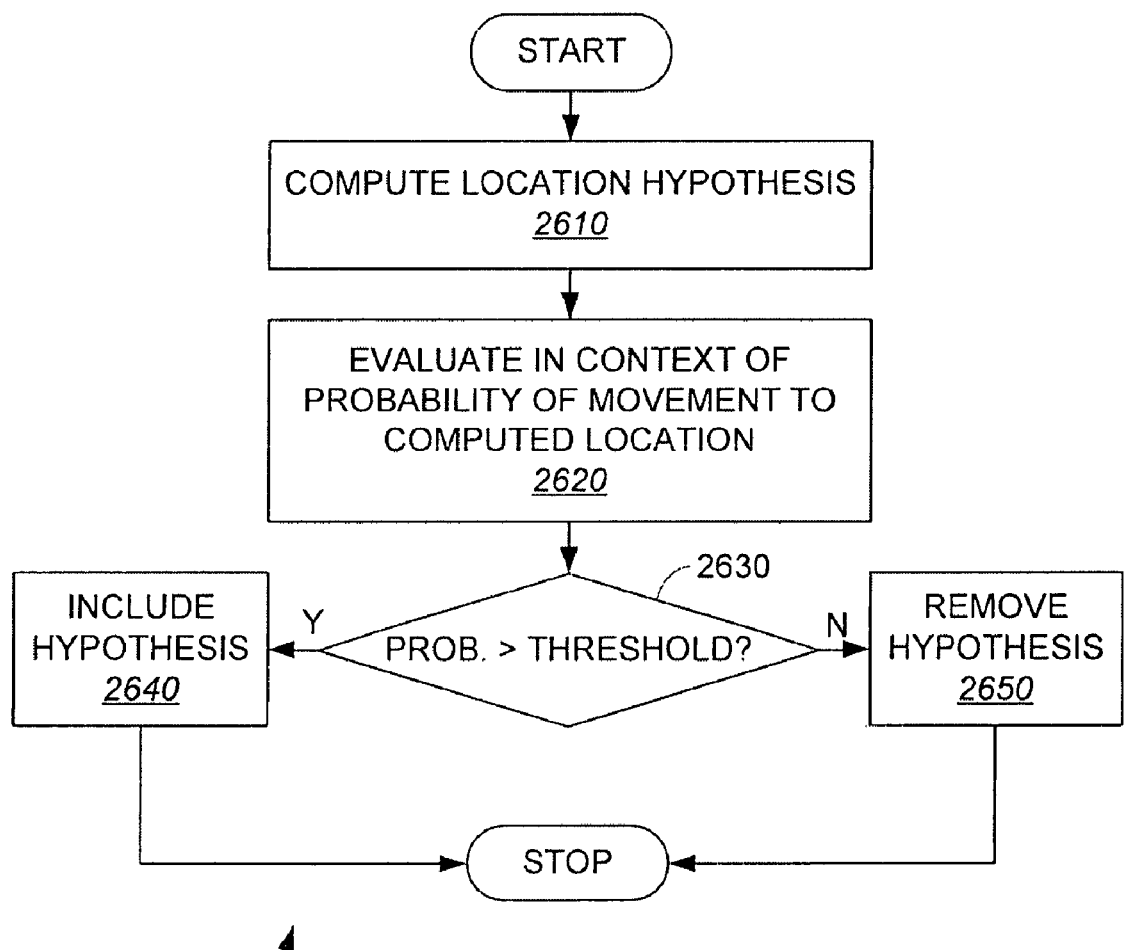
FIG. 26 depicts an example method for selecting location hypotheses for use in making a computed location determination.

A variety of techniques, including the number of measurements made at a previous location, the existence of barriers to movement, other detection techniques, the use of displacement vectors, and the like, are all examples of the general principle of determining the probability of a location determination being correct. FIG. 26 depicts example method 2600 for selecting location hypotheses for use in making a computed location determination. The process begins in block 2610 where a location hypothesis is computed using any of the above techniques. For example, one or more position location models may be deployed using the updated mapped space to determine one or more hypothetical locations. In block 2620, that location hypothesis is evaluated in context of the probability of movement to that computed location. The probability, as described above, may be determined in accordance with knowledge of existing barriers, the relative number of measurements at a certain location, other sensors, computed displacement vectors, and the like. In decision block 2630, if the probability of movement to that location is above a threshold, then that hypothesis is retained in block 2640. The hypothesis may be included in a list. If the probability of the computed location is less than its predetermined threshold in decision block 2630, then in block 2650 the hypothesis is removed from the list. The process may then stop. This process 2600 may be deployed in a master positioning engine such as master positioning engine 1820, 1930 or 2030, to include hypotheses from one or more sources and perform averaging on any remaining hypotheses.

Location queries or requests from various applications may be made to a positioning engine for location data regarding one or more assets 170 being tracked within system 100. A response may comprise a location as well as a confidence level. Various alternative embodiments may include position responses that incorporate other types of information as well. A location may be identified as a two-dimensional location, given by X and Y coordinates. Or a location may be a three-dimensional location, identified by X, Y and Z coordinates. A confidence level may be associated with any location position. In addition, more complex information may be returned to give a more detailed response to a position query.

Figure 27:
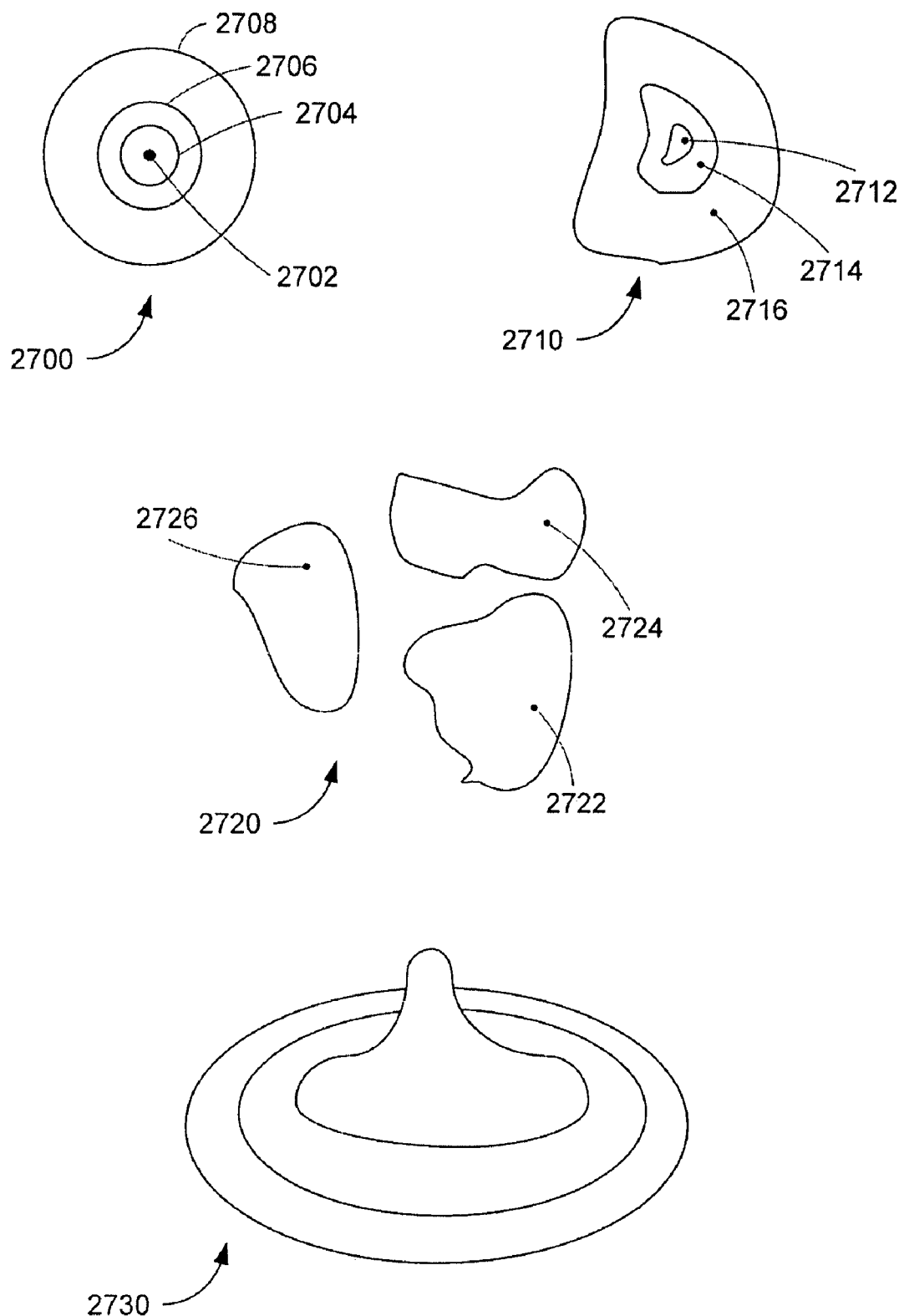
FIG. 27 depicts various examples of position results.

Various examples of position results are depicted graphically in FIG. 27. Result 2700 is indicated by a position location identified as point 2702 in an example embodiment. Point 2702 may be indicated by X, Y coordinates. Concentric circles 2704, 2706 and 2708 surround location 2702. In one embodiment, each concentric circle represents an area assigned a confidence level that the asset to be located is within that area. The confidence level generally increases for a greater radius. As such, an example position response may include a location along with one or more radii indicating concentric circles around the location to identify varying confidence levels. Any number of concentric circles may be given. In the example just given, only the radius needs to be returned, when the confidence level for the area within a circle is predetermined or predefined.

In an alternate embodiment, circles may be returned with a radius as well as a confidence level associated with that radius, and the pair of values including the radius and the confidence level for each concentric circle indicate a confidence level for a resulting area. Note that the two dimensional example just described may be extended to three dimensions by including a Z coordinate with point 2702 and identifying circles 2704, 2706 and 2708 as concentric spheres given the same radius information.

The concept of providing one or more areas to correspond with confidence levels for the location of an asset being within that area may be expanded to any area shape. An example embodiment is depicted as position response 2710 in FIG. 27. Note the three areas 2712, 2714 and 2716, which may be defined or returned as a position response. Each area has associated with it a confidence level that the asset being located is within the area.

In yet another alternative, depicted as response 2720, one or more disjoint areas 2722-2726 may be defined for the location of an asset with a given confidence level. Note that a response, such as response 2720, may be further processed using one or more of the various techniques described above to eliminate all or part of one or more of the disjoint areas to reduce the uncertainty. Or, the response 2720 may be given in addition to one or more points identified with a lower confidence interval and the disjoint areas represent a high confidence interval. Note again, that for three-dimensional applications, shapes indicated in 2710 and 2720 may be made into three-dimensional volumes indicating the same information for three dimensional position response.

In yet another example, any surface area may be generated indicating the probability of the device being located at that X, Y coordinate. For example, a gradient surface area tapering away from an expected location at an X, Y coordinate is depicted as position response 2730 in FIG. 27. Such a gradient may be returned in practice as a matrix of probabilities surrounding a position point. Various other embodiments may also be deployed by one of skill in the art in light of the teaching herein.

In the foregoing, various methods have been described using example sets of blocks. Those of skill in the art will recognize that method steps can be interchanged, and subsets of methods defined, without departing from the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

We claim as our invention:

1. An apparatus for locating and tracking at least one mobile object within an indoor facility, the indoor facility including a plurality of beacon emitters positioned therein, a plurality of removable network monitors, and a tag associated with the at least one mobile object, each beacon emitter generating a radiofrequency signal, each network monitors attached to a wall outlet at a known location of the indoor facility and generating a first plurality of measurements comprising data including signal strength from each of the plurality of beacon emitters received by at least one of the removable network monitors, the tag generating a second plurality of measurements comprising data including signal strength from each of the plurality of beacon emitters received by the tag, the apparatus comprising:
   a database storing a mapped space of the indoor facility, wherein the mapped space comprises a function and one or more parameters, the function returning a location estimate in response to one or more measurements and the one or more parameters, the parameters being adjusted in response to the first plurality of measurements, wherein the function is selected from a Kalman filter, a Bayesian filter or a neural network;
   a memory for storing known location information for each of the plurality of removable network monitors;
   a receiver for receiving the first plurality of measurements from one or more network monitors and the second plurality of measurements from the tag associated with the at least one mobile object; and
   a processor for updating the mapped space in response to the received first plurality of measurements, the processor updating the mapped space by:
   computing a location estimate of a removable network monitor in accordance with the respective first plurality of measurements and the mapped space;
   comparing the location estimate with the respective known location information for the removable network monitor to generate a location error estimate; and adjusting one or more parameters in accordance with the location error estimate,
   wherein the processor generates an object position location estimate for the object from the received second plurality of measurements and the mapped space and wherein the processor generates a removable network monitor position location estimate for the plurality of removable network monitors in response to the first plurality of measurements and generates one or more error estimates for the plurality of removable network monitors, each error estimate generated in accordance with a difference between the known location information and generated network monitor position location for the respective removable network monitor.

2. The apparatus of claim 1 wherein the processor repeats the mapped space updating until a location error estimate is less than a pre-determined threshold.

3. The apparatus of claim 1 wherein the mapped space comprises one or more mappings, one of the mappings selected according to an index value, the index value computed in accordance with time, derived from one or more of the first plurality of measurements, computed in accordance with a humidity measurement, or computed in accordance with a temperature measurement.

4. The apparatus of claim 1 wherein the processor generates the mobile object position location estimate further in response to one or more of the error estimates, the one or more error estimates being selected based on the proximity of the respective one or more removable network monitors to the object.

5. The apparatus of 4 wherein the processor produces a weighted average of the one or more error estimates, the weights being selected in accordance with the proximity in signal space of each removable network monitor to the object.

6. A method of locating and tracking at least one object within an indoor facility, the indoor facility including a plurality of beacon emitters positioned therein, a plurality of removable network monitors, and a tag associated with the at least one mobile object, each beacon emitter generating a radiofrequency signal, each removable network monitor removably attached to a wall outlet at a known location of the indoor facility and generating a first plurality of measurements comprising data including signal strength from each of the plurality of beacon emitters received by at least one of the removable network monitors, the tag generating a second plurality of measurements comprising data including signal strength from each of the plurality of beacon emitters received by the tag, the method comprising:
   receiving the first plurality of measurements from the plurality of removable network monitors;
   receiving the second plurality of measurements from the tag associated with the at least one mobile object;
   updating a mapped space in response to the received first plurality of measurements;
   storing known location information for each of the plurality of removable network monitors;
   computing a location estimate of a removable network monitor in accordance with the received first plurality of measurements and the mapped space;
   comparing the location estimate with the respective known location information for the removable network monitor to generate a location error estimate;
   adjusting the mapped space in accordance with the location error estimate; and
   generating a position location response for the at least one mobile object, determined in accordance with one or more of the second plurality of measurements and the mapped space.

7. The method of claim 6 further comprising:
   receiving a position location query for the tag associated with an identified object, wherein the position location response is generated for the identified mobile object;
   directing the tag associated with the identified object to update the plurality of second measurements in response to a query;
   returning a stored location for the identified object in response to query, wherein the response comprises a set of coordinates, a confidence level, an error estimate, or an area and a confidence level associated with the area.

* * * * *